US012608455B2

(12) United States Patent
Bhat et al.

(10) Patent No.: US 12,608,455 B2
(45) Date of Patent: Apr. 21, 2026

(54) RESOURCE UTILIZATION ESTIMATION AND ALLOCATION FOR MULTI-AGENT COMPUTATIONAL SYSTEMS

(71) Applicant: Citibank, N.A., New York, NY (US)

(72) Inventors: Ganesh Prasad Bhat, West Orange, NJ (US); James Myers, New York, NY (US); Payal Jain, London (GB); Tariq Husayn Maonah, London (GB); Mariusz Saternus, Cracow (PL); Daniel Lewandowski, Cracow (PL); Biraj Krushna Rath, London (GB); Stuart Murray, London (GB); Philip Davies, London (GB); Sourabh Deb, Tampa, FL (US); Jason Engelbrecht, London (GB); Zheyu Wang, Shanghai (CN); Haolin Jin, Shanghai (CN); Avi Levin, Tel Aviv (IL); Nimrod Barak, New York, NY (US); Miriam Silver, Tel Aviv (IL)

(73) Assignee: Citibank, N.A., New York, NY (US)

( * ) Notice: Subject to any disclaimer, the term of this patent is extended or adjusted under 35 U.S.C. 154(b) by 0 days.

(21) Appl. No.: 19/328,030

(22) Filed: Sep. 12, 2025

(65) Prior Publication Data

US 2025/0390565 A1 Dec. 25, 2025

Related U.S. Application Data

(63) Continuation-in-part of application No. 18/951,120, filed on Nov. 18, 2024, which is a continuation of
(Continued)

(51) Int. Cl.
G06F 21/62 (2013.01)
G06F 21/31 (2013.01)
G06F 40/20 (2020.01)

(52) U.S. Cl.
CPC .......... *G06F 21/31* (2013.01); *G06F 21/6218* (2013.01); *G06F 40/20* (2020.01)

(58) Field of Classification Search
None
See application file for complete search history.

(56) References Cited

U.S. PATENT DOCUMENTS 11,368,524 B1 * 6/2022 Musumeci .............. H04L 41/16
2018/0205618 A1 * 7/2018 Weiner ................ H04L 41/5012
(Continued)

FOREIGN PATENT DOCUMENTS

CN 116724294 A * 9/2023 .............. G06F 9/50
CN 118193215 A * 6/2024 .............. G06N 20/00
(Continued)

*Primary Examiner* — J. Brant Murphy
*Assistant Examiner* — Hassan Saadoun
(74) *Attorney, Agent, or Firm* — Perkins Coie LLP; Sumedha Ahuja; Alice Jenkins

(57) ABSTRACT

Systems, methods, and devices for facilitating computational resource access by artificial intelligence (AI) agents through token-based allocation and multi-agent workflow optimization. The system generates tokens corresponding to computational resources including processing power, memory, storage, and bandwidth. AI agents submit resource requests with priority tokens, creating queues ordered by priority token quantity. Higher-priority bids receive preferential positions. The system transfers resource tokens to agents based on queue order, enabling resource access through token exchange. The system can receive user prompts indicating computational objectives and determines multiple AI agentic approaches comprising AI model sequences. After evaluating approaches against operational policies, the system generates resource utilization and performance estimates, executing a preferred approach balancing efficiency with output quality. All transactions, including
(Continued)

participating agents, token transfers, selected agentic approaches, and estimates, are recorded on a distributed ledger for transparency.

20 Claims, 16 Drawing Sheets

Related U.S. Application Data application No. 18/633,293, filed on Apr. 11, 2024, now Pat. No. 12,147,513, application No. 19/328,030 is a continuation-in-part of application No. 18/907,414, filed on Oct. 4, 2024, which is a continuation of application No. 18/661,532, filed on May 10, 2024, now Pat. No. 12,111,747, which is a continuation-in-part of application No. 18/661,519, filed on May 10, 2024, now Pat. No. 12,106,205, which is a continuation-in-part of application No. 18/633,293, filed on Apr. 11, 2024, now Pat. No. 12,147,513, application No. 19/328,030 is a continuation-in-part of application No. 18/812,913, filed on Aug. 22, 2024, which is a continuation-in-part of application No. 18/661,532, filed on May 10, 2024, now Pat. No. 12,111,747, application No. 19/328,030 is a continuation-in-part of application No. 19/204,706, filed on May 12, 2025, which is a continuation of application No. 18/830,573, filed on Sep. 11, 2024, now Pat. No. 12,321,862, which is a continuation-in-part of application No. 18/821,880, filed on Aug. 30, 2024, which is a continuation-in-part of application No. 18/661,532, filed on May 10, 2024, now Pat. No. 12,111,747, application No. 19/328,030 is a continuation-in-part of application No. 19/325,796, filed on Sep. 11, 2025, which is a continuation-in-part of application No. 19/279,103, filed on Jul. 24, 2025, now Pat. No. 12,536,406, which is a continuation-in-part of application No. 18/812,913, filed on Aug. 22, 2024.

(56) References Cited

U.S. PATENT DOCUMENTS

| | | | | |
|---|---|---|---|---|
| 2018/0314735 A1* | 11/2018 | Liu | .................... | G06N 20/10 |
| 2022/0122015 A1* | 4/2022 | Bandopadhyay | .. | G06Q 10/0635 |
| 2022/0284582 A1* | 9/2022 | Yang | .................. | G06N 3/0985 |

FOREIGN PATENT DOCUMENTS

| CN | 118245171 A | * | 6/2024 | .......... | G06F 9/4843 |
|---|---|---|---|---|---|
| EP | 4149071 B1 | * | 1/2025 | .......... | G06F 9/4856 |
| WO | WO-2020160252 A1 | * | 8/2020 | ........... | G06N 3/045 |

* cited by examiner

1100

1102

Determine that a set of computational resources is available for consumption by a plurality of models

1104

Generate a set of tokens of corresponding token types for the set of computational resources

1106

Receive a set of requests, from a set of models of the plurality of models, to access a first computational resource of the set of computational resources

1108

Determine a queue of the set of requests

1110

Perform, based on the order of the queue, a transfer of one or more tokens of a first type corresponding to the first computational resource to one or more models of the set of models

1112

Record, via a distributed ledger, the one or more models involved in the transfer and the one or more tokens transferred to the one or more models

/1152

Receive a request from a user

/1154

Determine, based on the request, a plurality of agentic approaches for processing the request

/1156

Determine a subset of the plurality of agentic approaches, wherein the subset comprises agentic approaches that comply with one or more operational policies

/1158

Generate, for each agentic approach of the subset, a resource utilization estimate and a performance estimate

/1160

Execute, based on the resource utilization estimate and the performance estimate for each agentic approach, a particular agentic approach of the subset

/1162

Record, via a distributed ledger, the particular AI agentic approach, the resource utilization estimate, and the performance estimate

RESOURCE UTILIZATION ESTIMATION AND ALLOCATION FOR MULTI-AGENT COMPUTATIONAL SYSTEMS

CROSS-REFERENCE TO RELATED APPLICATIONS

This application is a continuation-in-part of U.S. patent application Ser. No. 18/951,120, filed Nov. 18, 2024, entitled "DYNAMIC EVALUATION OF LANGUAGE MODEL PROMPTS FOR MODEL SELECTION AND OUTPUT VALIDATION AND METHODS AND SYSTEMS OF THE SAME," which is a continuation of U.S. patent application Ser. No. 18/633,293, filed Apr. 11, 2024, entitled "DYNAMIC EVALUATION OF LANGUAGE MODEL PROMPTS FOR MODEL SELECTION AND OUTPUT VALIDATION AND METHODS AND SYSTEMS OF THE SAME."

This application is further a continuation-in-part of U.S. patent application Ser. No. 18/907,414, filed Oct. 4, 2024, entitled "DYNAMIC INPUT-SENSITIVE VALIDATION OF MACHINE LEARNING MODEL OUTPUTS AND METHODS AND SYSTEMS OF THE SAME," which is a continuation of U.S. patent application Ser. No. 18/661,532, filed May 10, 2024, entitled "DYNAMIC INPUT-SENSITIVE VALIDATION OF MACHINE LEARNING MODEL OUTPUTS AND METHODS AND SYSTEMS OF THE SAME," which is a continuation-in-part of U.S. patent application Ser. No. 18/661,519, filed May 10, 2024, entitled "DYNAMIC, RESOURCE-SENSITIVE MODEL SELECTION AND OUTPUT GENERATION AND METHODS AND SYSTEMS OF THE SAME," which is a continuation-in-part of U.S. patent application Ser. No. 18/633,293, filed Apr. 11, 2024, entitled "DYNAMIC EVALUATION OF LANGUAGE MODEL PROMPTS FOR MODEL SELECTION AND OUTPUT VALIDATION AND METHODS AND SYSTEMS OF THE SAME."

This application is further a continuation-in-part of U.S. patent application Ser. No. 18/812,913, filed Aug. 22, 2024, entitled "DYNAMIC SYSTEM RESOURCE-SENSITIVE MODEL SOFTWARE AND HARDWARE SELECTION," which is a continuation-in-part of U.S. patent application Ser. No. 18/661,532, filed May 10, 2024, entitled "DYNAMIC INPUT-SENSITIVE VALIDATION OF MACHINE LEARNING MODEL OUTPUTS AND METHODS AND SYSTEMS OF THE SAME," which is a continuation-in-part of U.S. patent application Ser. No. 18/661,519, filed May 10, 2024, entitled "DYNAMIC, RESOURCE-SENSITIVE MODEL SELECTION AND OUTPUT GENERATION AND METHODS AND SYSTEMS OF THE SAME," which is a continuation-in-part of U.S. patent application Ser. No. 18/633,293, filed Apr. 11, 2024, entitled "DYNAMIC EVALUATION OF LANGUAGE MODEL PROMPTS FOR MODEL SELECTION AND OUTPUT VALIDATION AND METHODS AND SYSTEMS OF THE SAME."

This application is further a continuation-in-part of U.S. patent application Ser. No. 19/204,706, filed May 12, 2025, entitled "LATENCY-, ACCURACY-, AND PRIVACY-SENSITIVE TUNING OF ARTIFICIAL INTELLIGENCE MODEL SELECTION PARAMETERS AND SYSTEMS AND METHODS OF THE SAME," which is a continuation of U.S. patent application Ser. No. 18/830,573, filed Sep. 11, 2024, entitled "LATENCY-, ACCURACY-, AND PRIVACY-SENSITIVE TUNING OF ARTIFICIAL INTELLIGENCE MODEL SELECTION PARAMETERS AND SYSTEMS AND METHODS OF THE SAME," which is a continuation-in-part of U.S. patent application Ser. No. 18/821,880, filed Aug. 30, 2024, entitled "SYSTEM-SENSITIVE MACHINE LEARNING MODEL SELECTION AND OUTPUT GENERATION AND SYSTEMS AND METHODS OF THE SAME," which is a continuation-in-part of U.S. patent application Ser. No. 18/661,532, filed May 10, 2024, entitled "DYNAMIC INPUT-SENSITIVE VALIDATION OF MACHINE LEARNING MODEL OUTPUTS AND METHODS AND SYSTEMS OF THE SAME," which is a continuation-in-part of U.S. patent application Ser. No. 18/661,519, filed May 10, 2024, entitled "DYNAMIC, RESOURCE-SENSITIVE MODEL SELECTION AND OUTPUT GENERATION AND METHODS AND SYSTEMS OF THE SAME," which is a continuation-in-part of U.S. patent application Ser. No. 18/633,293, filed Apr. 11, 2024, entitled "DYNAMIC EVALUATION OF LANGUAGE MODEL PROMPTS FOR MODEL SELECTION AND OUTPUT VALIDATION AND METHODS AND SYSTEMS OF THE SAME."

This application is further a continuation-in-part of U.S. patent application Ser. No. 19/325,796, filed Sep. 11, 2025, entitled "HIERARCHICAL CASCADE ARCHITECTURE OF SEMANTIC FINGERPRINTING OPERATIONS FOR AGENT ROUTING," which is a continuation-in-part of U.S. patent application Ser. No. 19/279,103 entitled "DYNAMIC ARTIFICIAL INTELLIGENCE AGENT ORCHESTRATION USING A LARGE LANGUAGE MODEL GATEWAY ROUTER" and filed Jul. 24, 2025, which is a continuation-in-part of U.S. patent application Ser. No. 18/812,913 entitled "DYNAMIC SYSTEM RESOURCE-SENSITIVE MODEL SOFTWARE AND HARDWARE SELECTION" and filed Aug. 22, 2024, which is a continuation-in-part of U.S. patent application Ser. No. 18/661,532 entitled "DYNAMIC INPUT-SENSITIVE VALIDATION OF MACHINE LEARNING MODEL OUTPUTS AND METHODS AND SYSTEMS OF THE SAME" and filed May 10, 2024, which is a continuation-in-part of U.S. patent application Ser. No. 18/661,519 entitled "DYNAMIC, RESOURCE-SENSITIVE MODEL SELECTION AND OUTPUT GENERATION AND METHODS AND SYSTEMS OF THE SAME" and filed May 10, 2024, and is a continuation-in-part of U.S. patent application Ser. No. 18/633,293 entitled "DYNAMIC EVALUATION OF LANGUAGE MODEL PROMPTS FOR MODEL SELECTION AND OUTPUT VALIDATION AND METHODS AND SYSTEMS OF THE SAME" and filed Apr. 11, 2024. This application is related to U.S. patent application Ser. No. 18/653,858 entitled "VALIDATING VECTOR CONSTRAINTS OF OUTPUTS GENERATED BY MACHINE LEARNING MODELS" and filed May 2, 2024, and U.S. patent application Ser. No. 18/637,362 entitled "DYNAMICALLY VALIDATING AI APPLICATIONS FOR COMPLIANCE" and filed on Apr. 16, 2024.

The content of the foregoing applications is incorporated herein by reference in its entirety.

BACKGROUND

Computational agents are software entities designed to operate independently within distributed computing environments. These agents can perform various tasks such as data processing, machine learning model execution, and automated decision-making without direct human intervention. In multi-agent systems, numerous computational agents can operate simultaneously, each requiring access to shared computational resources including processing power, memory, storage, and network bandwidth.

Resource allocation in distributed computing systems involves the management of computational resources and their assignment to various processes, applications, or agents based on their requirements and system constraints. Traditional approaches to resource allocation often rely on centralized schedulers, fixed priority schemes, or static partitioning methods. These systems balance competing demands for limited resources while maintaining system performance and preventing resource starvation.

Blockchain technology provides a distributed ledger system that enables secure, transparent, and decentralized record-keeping without requiring a trusted central authority. Smart contracts, which are self-executing programs deployed on blockchain networks, can automatically enforce agreements and execute transactions based on predetermined conditions. Token-based systems built on blockchain platforms allow for the creation of digital assets that can represent various forms of value or utility, enabling new forms of economic interaction and resource management in distributed systems.

SUMMARY

As organizations increasingly deploy artificial intelligence (AI) systems to handle complex computational tasks, a significant challenge they face is efficiently managing and allocating resources across multiple models or agents. AI systems often require substantial computational resources, including processing power, memory, storage, and network bandwidth, which can be expensive and limited. The challenge becomes even more complex when multiple AI agents are required to work together in sequence to accomplish sophisticated objectives, as each agent in the sequence can have different resource requirements and performance characteristics.

Traditional approaches to AI resource allocation typically rely on centralized schedulers, fixed priority schemes, or static resource partitioning. These conventional methods suffer from several limitations. First, they cannot adapt to dynamic workloads, leading to inefficient resource utilization during periods of varying demand. Second, they lack mechanisms for organizations to evaluate the cost-effectiveness of different AI approaches before committing resources to execution. Third, they provide no incentives for resource conservation or sharing among different AI models. Fourth, they are susceptible to central points of failure and cannot scale effectively as the number of AI agents increases.

Furthermore, existing systems fail to provide adequate mechanisms for evaluating the end-to-end costs and benefits of complex multi-agent AI workflows before execution begins. Organizations currently struggle to determine whether deploying multiple AI agents in sequence will provide sufficient value to justify the resource expenditure. This lack of predictive cost and performance analysis leads to inefficient resource allocation decisions and can result in budget overruns or suboptimal AI implementations.

The disclosed system overcomes the limitations of conventional approaches by implementing a token-based economy for resource allocation, where different types of computational resources are represented by distinct tokens. This approach creates market-driven incentives for efficient resource usage and enables AI models to share idle resources with other models in exchange for compensation. The system also incorporates priority queuing mechanisms that allow time-sensitive tasks to receive expedited processing while maintaining fairness for all participants.

Moreover, the system implements a comprehensive system for evaluating, selecting, and managing multi-agent AI workflows based on resource utilization estimates and performance predictions. The system enables organizations to make informed decisions about AI resource allocation by analyzing multiple potential approaches before execution and selecting a preferred option. Additionally, the system implements advanced resource management techniques, including token-based resource allocation, priority queuing, and peer-to-peer resource sharing, to optimize overall system efficiency. The system further addresses scalability concerns by implementing a distributed architecture that can handle large numbers of AI agents without relying on centralized control. Through the use of distributed ledger technology, the system maintains transparent records of resource allocation decisions and performance outcomes, enabling continuous optimization of the resource management algorithms.

In particular, the system can determine that a set of computational resources is available for consumption by a plurality of AI agents, where the computational resources can include processing power, memory, storage, or bandwidth. For example, the system can identify that a distributed computing environment has 1000 central processing unit (CPU) cores, 500 gigabyte (GB) of available memory, 10 terabyte (TB) of storage capacity, and 100 gigabytes per second (Gbps) of network bandwidth that can be allocated among various AI agents. The AI agents are enabled to access these computational resources by exchanging tokens for access to the resources, creating a market-based mechanism for resource allocation. In some implementations, different types of computational resources are represented by distinct token types, such as compute tokens for processing power, memory tokens for random-access memory (RAM) allocation, storage tokens for disk space, and bandwidth tokens for network throughput.

Moreover, the system generates a set of tokens of corresponding token types for the set of computational resources. In particular, the token generation process creates digital representations of the available resources, where each token type corresponds to a specific resource category. For example, if 1000 CPU cores are available, the system can generate 1000 compute tokens, with each token representing the right to access one CPU core for a specified duration. The system can implement various token generation strategies, such as minting tokens based on real-time resource availability, creating tokens through smart contracts that automatically adjust supply based on demand, or issuing tokens according to predefined allocation policies that ensure fair distribution among system participants.

The system receives a set of requests from AI agents to access a first computational resource of the set of computational resources, where each request includes a number of priority tokens associated with the request. In particular, these priority tokens serve as a signaling mechanism that allows AI agents to indicate the urgency or importance of their resource needs. For example, an AI agent performing time-sensitive machine learning inference can submit a request for graphics processing unit (GPU) resources along with 75 priority tokens, while another agent handling batch processing can include only 25 priority tokens with its request. In some implementations, the priority tokens create a competitive bidding environment where agents can express their willingness to pay higher costs for faster access to needed resources.

The system then determines a queue of the set of requests, where the order of the queue is based on the number of priority tokens associated with each request. In particular, this queuing mechanism creates a fair and transparent method for prioritizing resource allocation based on the stated importance of each request. For example, requests with higher-priority token counts are placed ahead of those with lower counts, ensuring that more urgent tasks receive preferential treatment. The system can implement multiple queue tiers, such as premium queues for requests with 100+ priority tokens, standard queues for requests with 50-99 tokens, and economy queues for requests with fewer than 50 tokens, creating structured access levels that balance efficiency with fairness.

The system performs, based on the order of the queue, a transfer of resource tokens to AI agents in exchange for their priority tokens. In particular, this token exchange mechanism creates a market-like environment where agents can obtain needed resources by offering appropriate compensation in the form of priority tokens. For example, when an AI agent reaches the front of the queue and has offered 75 priority tokens for compute resources, the system transfers the requested compute tokens to that agent and collects the 75 priority tokens as payment. The transferred resource tokens give the agent the right to access and use the corresponding computational resource, creating a two-step process whereby agents first obtain resource tokens through priority token exchange, and then use those resource tokens to access actual computational resources. The system also records, via a distributed ledger, the AI agents involved in the transfer, the tokens transferred, and the priority tokens exchanged, creating a permanent and transparent record of all resource allocation activities that enables audit trails, performance analysis, and continuous optimization of the resource management algorithms.

In some implementations, the system receives a prompt from a user indicating one or more computational objectives. For example, a user can submit a complex request that requires multiple AI models to work together, such as analyzing a document, extracting key information, and generating a summary report. The system then determines, based on the prompt, a plurality of AI agentic approaches for processing the prompt, where each agentic approach includes a sequence of multiple AI models configured to perform respective sub-tasks required to achieve the computational objectives. In some implementations, the system can identify different combinations of AI models that can accomplish the same objective, such as using a document analysis model followed by a summarization model, or alternatively using a more comprehensive model that can handle both tasks simultaneously.

Moreover, the system determines a subset of the plurality of agentic approaches, where the subset includes agentic approaches that comply with one or more operational policies indicating resource allocation constraints. In particular, these constraints can include progressive allocation tiers, anti-hoarding measures, minimum resource usage guarantees, and stability controls that ensure fair and efficient resource distribution across all system participants.

The system generates, for each agentic approach of the subset, a resource utilization estimate and a performance estimate. In particular, the resource utilization estimate represents an anticipated resource consumption of each agentic approach and the performance estimate represents a value of an expected output from each agentic approach. For example, the system can calculate that one approach will require 100 compute units and 50 memory units while producing an output with an estimated accuracy of 95%, while another approach will require 150 compute units and 30 memory units while producing an output with an estimated accuracy of 98%. In some implementations, the resource utilization estimate and the performance estimate are calculated based on an evaluation of the sequence of multiple AI models and the respective sub-tasks involved in each agentic approach.

The system then executes, based on the resource utilization estimate and the performance estimate for each agentic approach, a particular agentic approach of the subset. In particular, the agentic approach optimizes the resource utilization estimate and the performance estimate, meaning it provides the best balance between resource efficiency and expected performance quality. Thus, the system can automatically select the most cost-effective approach for achieving the user's computational objectives. The system also records, via a distributed ledger, the particular agentic approach, the resource utilization estimate, and the performance estimate, creating a transparent and auditable record of resource allocation.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

BRIEF DESCRIPTION OF FIGURES

FIG. 11A shows a flowchart of a method for facilitating access to computational resources by agents, in accordance with some implementations of the present technology.

FIG. 11B shows a flowchart of a method for routing execution requests to autonomous artificial intelligence (AI) agents, in accordance with some implementations of the present technology.

Figure 1:
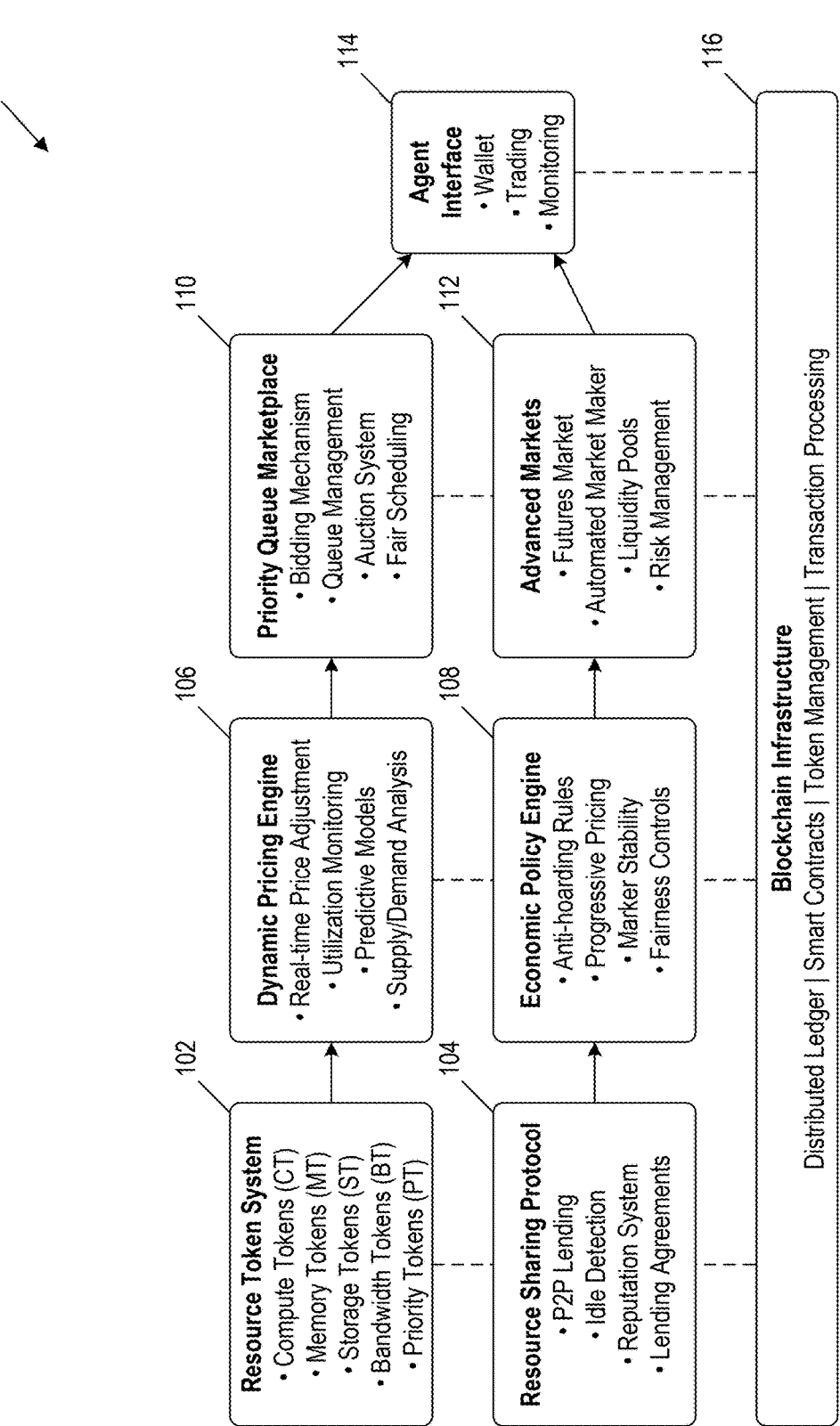
FIG. 1 shows a system architecture diagram of an economic model for agent resource allocation, in accordance with some implementations of the present technology.

The technologies described herein will become more apparent to those skilled in the art from studying the Detailed Description in conjunction with the drawings. Implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

In the following description, for the purposes of explanation, numerous specific details are set forth in order to provide a thorough understanding of the disclosed implementations. It will be appreciated, however, by those having skill in the art, that the implementations can be practiced without these specific details or with an equivalent arrangement. In other cases, well-known models and devices are shown in block diagram form in order to avoid unnecessarily obscuring the disclosed implementations. It should also be noted that the methods and systems disclosed herein are also suitable for applications unrelated to multi-agent computational resource allocation or estimation.

FIG. 1 shows a system architecture 100 of an economic model for agent resource allocation, in accordance with some implementations of the present technology. The system architecture 100 includes multiple interconnected components that work together to facilitate efficient resource allocation among computational agents. The system includes a resource token system 102, a resource sharing protocol 104, a dynamic pricing engine 106, an economic policy engine 108, a priority queue marketplace 110, advanced markets 112, an agent interface 114, and a blockchain infrastructure 116.

The resource token system 102 serves as the foundation for resource representation within the architecture. This system manages various types of tokens that correspond to different computational resources. These include compute tokens that represent processing power, memory tokens that represent RAM allocation, storage tokens that represent disk space, and bandwidth tokens that represent network throughput. Additionally, the system manages priority tokens that enable agents to indicate the urgency or importance of their resource requests. For example, an agent performing time-sensitive tasks can use priority tokens to gain preferential access to needed resources.

The resource sharing protocol 104 implements peer-to-peer resource sharing capabilities within the system. This protocol includes idle resource detection mechanisms that identify underutilized computational resources, a reputation system that tracks the reliability and performance of agents, and lending agreement functionality that formalizes resource sharing arrangements. For instance, when an agent completes its processing tasks but still has allocated GPU resources, the protocol enables it to share those resources with other agents that need additional computational power.

The dynamic pricing engine 106 continuously adjusts the value of different resource tokens based on current system conditions. This engine incorporates real-time price adjustment algorithms, utilization monitoring capabilities, predictive models that anticipate future resource demands, and supply/demand analysis functionality. For example, if compute resources are becoming heavily utilized, the engine can increase the cost of compute tokens to reflect the scarcity of this resource and encourage more efficient usage.

The economic policy engine 108 establishes and enforces rules governing resource allocation within the system. This engine implements anti-hoarding rules that prevent agents from reserving more resources than they actually need, progressive pricing mechanisms that create graduated resource costs, market stability controls that prevent rapid fluctuations in resource allocation, and fairness controls that ensure equitable resource distribution. For instance, the engine can implement policies where the first 100 compute units are available at a base rate, while additional units come at progressively higher rates.

The priority queue marketplace 110 organizes resource requests based on their relative importance. This marketplace includes bidding mechanisms that allow agents to signal the urgency of their requests, queue management functionality that organizes requests in order of priority, auction systems that allocate resources to the highest bidders, and fair scheduling capabilities that balance efficiency with equitable access. For example, when multiple agents request the same scarce resource, the marketplace can prioritize requests with higher-priority token bids while still ensuring that lower-priority requests eventually receive service.

The advanced markets 112 component provides sophisticated resource allocation mechanisms beyond basic exchanges. This component includes futures market functionality that enables advance reservation of resources, automated market maker capabilities that facilitate token exchanges, liquidity pools that ensure resource availability, and management tools that maintain system stability. For instance, an agent anticipating high computational needs for a future training task can secure those resources in advance through the futures market functionality.

The agent interface 114 provides the means for computational agents to interact with the resource allocation system. This interface includes wallet functionality for managing tokens, trading capabilities for exchanging different token types, and monitoring tools for tracking resource usage and availability. For example, an agent can use the interface to check its token balances, submit resource requests, or monitor the status of pending requests.

The blockchain infrastructure 116 serves as the foundational layer supporting all other components of the architecture. This infrastructure provides distributed ledger capabilities that maintain transparent records of all resource allocations and token transfers, smart contract functionality that automates resource allocation agreements, token management features that track ownership and transfers, and transaction processing capabilities that ensure the integrity of all system operations. For instance, when an agent exchanges priority tokens for compute resources, the blockchain records this transaction in a transparent, immutable manner.

The components of the system architecture 100 are interconnected through communication pathways that enable data flow and interaction between the different modules of the system. These pathways facilitate the exchange of information such as resource availability updates, token transfer requests, pricing adjustments, and policy enforcement actions. The integrated nature of these components creates a comprehensive system for managing computational resources in multi-agent environments, with the blockchain infrastructure 116 providing a secure and transparent foundation for all resource allocation activities.

Token-Based Resource Allocation System

In some implementations, the system determines that a set of computational resources is available for consumption by a plurality of artificial intelligence (AI) agents, the set of computational resources including one or more of processing power, memory, storage, or bandwidth, wherein the plurality of AI agents is enabled to access computational resources by exchanging tokens for access to the computational resources. The AI agents are associated with a corresponding computer-executable operation set configured to be autonomously executed by a corresponding AI agent on a software application set. In some implementations, each AI agent includes specific operational capabilities that define the types of computational tasks it can perform independently. These computer-executable operation sets can encompass various functions such as data processing algorithms, machine learning inference procedures, natural language processing routines, or image recognition protocols. For example, an AI agent specialized in document analysis can have an operation set that includes text extraction, semantic analysis, and summarization functions that can be executed autonomously when the agent receives appropriate input data. The software application set can provide the runtime environment and supporting infrastructure that enables the AI agents to execute their operations, including libraries, frameworks, and system interfaces necessary for computational task completion.

In some implementations, computational resources refer to the various computing assets that AI agents need to perform their operations. These resources can include processing power (measured in CPU or GPU), memory (measured in gigabytes), storage capacity (measured in gigabytes or terabytes), and network bandwidth (measured in data transfer rates). For example, an AI agent performing complex machine learning tasks can require significant GPU processing power, while another agent focused on data analysis can primarily need memory resources. The system can determine resource availability through various methods, such as monitoring resource utilization metrics, receiving notifications from resource providers, or querying a centralized resource management system. Moreover, the token-based access mechanism creates a standardized way for AI agents to request and utilize resources, similar to how currency enables transactions in economic systems. For instance, an AI agent can exchange compute tokens to gain access to processing resources needed to train a machine learning model. This approach can facilitate efficient resource allocation by creating clear mechanisms for resource requests and utilization tracking.

The system generates a set of tokens of corresponding token types for the set of computational resources. In some implementations, tokens represent digital assets that correspond to specific computational resources. For example, compute tokens (CT) can represent processing power, memory tokens (MT) can represent RAM allocation, storage tokens (ST) can represent disk space, and bandwidth tokens (BT) can represent network throughput. Priority tokens (PT) serve a special purpose, allowing agents to indicate the urgency or importance of their resource requests. The system can generate tokens through various mechanisms, such as minting new tokens based on available resources, distributing tokens according to predefined allocation policies, or creating tokens through smart contracts on a blockchain platform. For instance, when new computational resources become available, the system can mint corresponding tokens that represent rights to access those resources.

The system receives a set of requests, from a set of models of the plurality of models, to access a first computational resource of the set of computational resources, each request including a number of priority tokens associated with the request. The requests from AI models typically include information about the specific resource needed, the quantity required, the duration of use, and the number of priority tokens the model is willing to exchange to gain preferential access. Thus, an AI model can request 100 compute units for 2 hours and include 50 priority tokens to indicate the importance of this request. The inclusion of priority tokens creates a mechanism for models to signal the relative importance of their requests, enabling more efficient resource allocation decisions.

Figure 2:
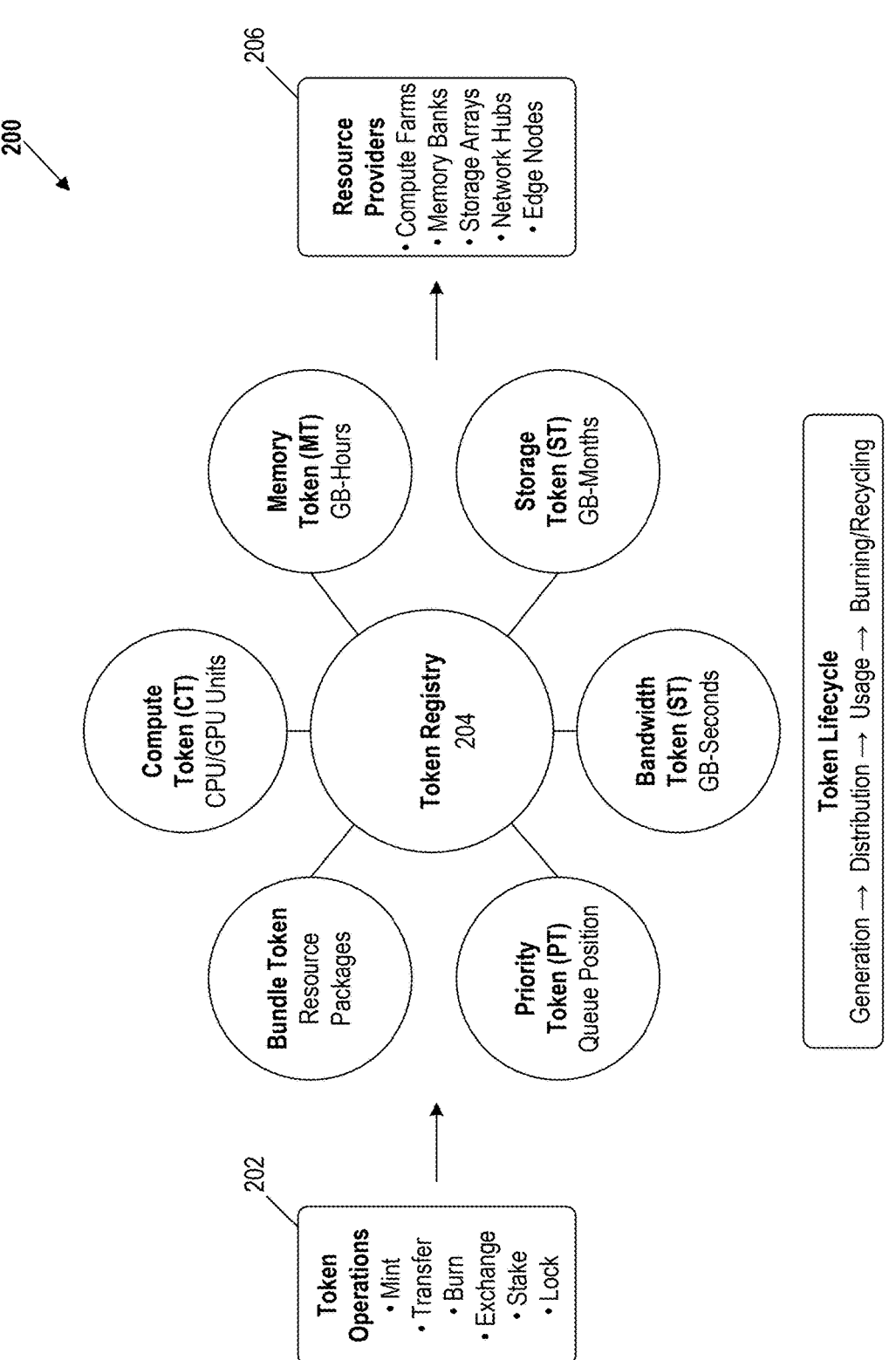
FIG. 2 illustrates a resource token system, in accordance with some implementations of the present technology.

FIG. 2 illustrates a resource token system 200, in accordance with some implementations of the present technology. The resource token system 200 includes several interconnected components that work together to manage and facilitate the exchange of computational resources through tokenization. The system includes token operations 202, a token registry 204, and connections to various resource providers 206. These components create a comprehensive framework for representing, tracking, and exchanging computational resources within a multi-agent environment.

The token operations 202 component implements various functions for managing the lifecycle of resource tokens. These operations include mint functions that create new tokens when resources become available, transfer capabilities that enable tokens to move between agents, burn operations that remove tokens from circulation when resources are consumed, exchange mechanisms that facilitate conversion between different token types, stake functions that allow agents to commit tokens for specific purposes, and lock operations that temporarily restrict token usage for reserved resources. For example, when a new GPU server comes online, the mint function can generate corresponding compute tokens that represent the newly available processing power.

The token registry 204 serves as the central repository for tracking all tokens within the system. This registry maintains records of different token types, including compute tokens (CT) measured in CPUs/GPUs that represent processing power, bundle tokens that combine multiple resource types into standardized packages, priority tokens (PT) that indicate queue position and request urgency, memory tokens (MT) measured in GB-hours that represent RAM allocation, storage tokens (ST) measured in GB-months that represent persistent data storage capacity, and bandwidth tokens (BT) measured in GB-seconds that represent network throughput. The registry tracks token ownership, transaction history, and current circulation status, providing a single source of truth for the token ecosystem.

The resource providers 206 represent the physical or virtual infrastructure that supplies the computational resources tokenized within the system. These providers include compute farms that offer processing power through CPU and GPU clusters, memory banks that provide RAM resources, storage arrays that offer persistent data storage capabilities, network hubs that supply bandwidth and connectivity resources, and edge nodes that provide distributed computing capabilities closer to data sources. Each provider connects to the token system, enabling the creation of corresponding tokens that accurately represent their available resources.

The resource token system 200 also illustrates the token lifecycle, showing how tokens progress through different stages from initial generation when resources become available, through distribution to agents that need resources, to usage when agents consume the resources, and finally to burning or recycling when the resources are released. This lifecycle ensures that tokens accurately reflect the current state of resource availability within the system at all times. For instance, when an AI agent completes a computational task and releases its allocated GPU resources, the corresponding compute tokens can be burned or recycled, making those resources available for other agents.

The interconnections between these components create a comprehensive system for representing computational resources as tradable tokens, enabling efficient allocation and utilization across multiple AI agents. The token-based approach provides a standardized method for quantifying, tracking, and exchanging different types of computational resources, facilitating more efficient resource management in complex multi-agent environments.

As previously discussed, the system can receive a set of requests, from a set of models of the plurality of models, to access a first computational resource of the set of computational resources, each request including a number of priority tokens associated with the request. The system determines a queue of the set of requests, where an order of the queue is based on the number of priority tokens associated with each request. For example, the system organizes incoming resource requests into a structured queue where the position is determined by the number of priority tokens attached to each request. Requests with higher-priority token counts are placed ahead of those with lower counts, creating a preference mechanism based on the perceived importance of each request. The queue can be implemented using various data structures such as priority queues, sorted arrays, or linked lists with priority values. In some implementations, the system can maintain multiple queue tiers, such as premium, standard, and economy queues, with minimum priority token thresholds for each tier. For instance, requests with 100+ priority tokens can enter the premium queue, those with 50-99 tokens enter the standard queue, and those with fewer than 50 tokens enter the economy queue. This tiered approach creates a structured way to handle requests of varying importance levels. Moreover, the queue order can be dynamically updated as new requests arrive, with higher-priority requests potentially moving ahead of already-queued lower-priority requests. Thus, the queuing mechanism creates a fair and transparent system for determining which resource requests should be processed first based on their stated importance.

Figure 4:
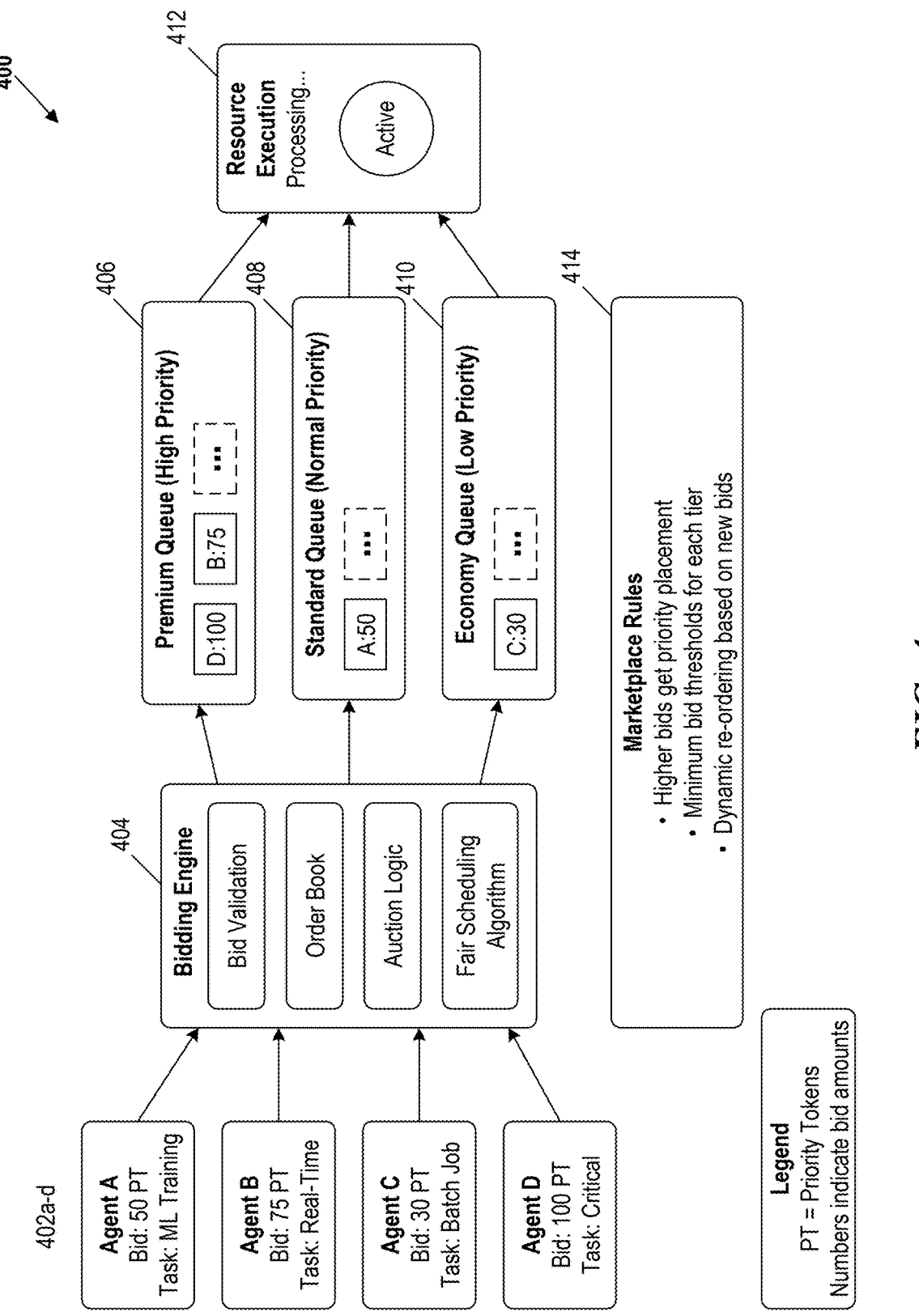
FIG. 4 illustrates a priority queue marketplace system, in accordance with some implementations of the present technology.

FIG. 4 illustrates a priority queue marketplace system 400, in accordance with some implementations of the present technology. The priority queue marketplace system 400 includes multiple interconnected components that work together to facilitate efficient resource allocation based on priority bidding. The system includes multiple agent modules 402a-d, a bidding engine 404, three queue levels (premium queue 406, standard queue 408, and economy queue 410), a resource execution processor 412, and a marketplace rules module 414. These components create a comprehensive framework for prioritizing resource requests within a multi-agent computational environment.

The agent modules 402a-d represent agents that submit resource requests with varying priority levels. Each agent specifies different bid amounts using priority tokens (PT) and indicates the type of computational task requiring resources. For example, agent module 402a can submit a bid of 50 PT for a machine learning (ML) training task, agent module 402b can offer 75 PT for real-time processing requirements, agent module 402c can provide 30 PT for batch job processing, and agent module 402d can bid 100 PT for critical operations. These agent modules can represent various types of AI systems, including machine learning models, data processing agents, analytical engines, or specialized computational services that require access to shared resources.

The bidding engine 404 serves as the central processing component for all resource requests and priority bids. This engine contains several specialized modules that work together to evaluate and organize incoming resource requests. The bid validation module verifies that submitted bids meet system requirements and contain valid token amounts. The order book management functionality maintains a comprehensive record of all active bids and their associated priority levels. The auction logic component implements algorithms for determining bid rankings and resource allocation based on priority token quantities. The fair scheduling algorithms ensure that while higher bids receive preferential treatment, lower-priority requests still receive appropriate consideration to prevent resource starvation. For instance, when agent module 402d submits a bid of 100 PT for a critical task, the bidding engine 404 can validate this bid, record it in the order book, determine its high-priority status through auction logic, and ensure it receives expedited processing while still maintaining fairness for other agents.

The system implements a tiered queuing structure with three distinct levels that organize resource requests based on their priority token bids. The premium queue 406 represents the highest priority tier, reserved for requests with substantial priority token bids. This queue provides the fastest access to computational resources, with requests in this queue processed before those in lower tiers. For example, the premium queue 406 can show agent D's request with 100 PT and agent B's request with 75 PT, indicating their high-priority status. The standard queue 408 serves as the intermediate priority level, containing requests with moderate priority token bids. This queue provides reasonable access times while balancing system efficiency. For instance, the standard queue 408 can contain agent A's request with 50 PT, representing a normal priority level. The economy queue 410 functions as the lowest priority tier, handling requests with minimal priority token bids. While requests in this queue receive lower priority, the system still ensures they eventually receive processing time. For example, the economy queue 410 can show agent C's request with 30 PT, indicating its lower-priority status.

The resource execution processor 412 manages the actual allocation and utilization of computational resources based on the queue priorities. This processor retrieves requests from the queues in order of priority, starting with the premium queue 406, then proceeding to the standard queue 408, and finally the economy queue 410 when higher-priority queues are empty. The processor maintains an "Active" status indicator that shows when resources are currently being utilized. The resource execution processor 412 can implement various execution strategies, such as time-slicing for sharing resources among multiple requests, preemptive execution for handling urgent high-priority tasks, or batch processing for efficiently handling multiple similar requests. For instance, when the premium queue 406 contains agent D's request with 100 PT, the resource execution processor 412 can allocate computational resources to this request before processing any requests from the standard or economy queues.

The marketplace rules module 414 establishes the governance framework for the entire priority queue system. This module defines key operational principles that ensure fair and efficient resource allocation. These principles include rules specifying that higher bids receive priority and precedence in resource allocation, minimum bid thresholds required for entry into each queue tier, and mechanisms for dynamic re-ordering of queues when new bids arrive. For example, the marketplace rules can specify that bids of 75 PT or higher qualify for the premium queue 406, bids from 40 to 74 PT enter the standard queue 408, and bids below 40 PT are placed in the economy queue 410. The rules can also establish that when a new high-priority bid arrives, the queues are immediately reorganized to reflect the updated priority ordering. These governance principles create a transparent, predictable system for resource allocation that balances the needs of high-priority tasks with fairness considerations for all system participants.

The interconnections between these components create a comprehensive system for prioritizing and managing resource requests based on their relative importance. The priority queue marketplace system 400 enables computational agents to express the urgency or importance of their resource needs through priority token bids, creating an efficient mechanism for allocating limited computational resources in environments where multiple agents compete for access. This market-based approach to resource prioritization helps optimize overall system efficiency by ensuring that the most valuable tasks receive preferential treatment while still maintaining fairness for all participants.

The system performs, based on the order of the queue, a transfer of one or more tokens of a first type corresponding to the first computational resource to one or more models of the set of models in exchange for the number of priority tokens associated with each respective request, wherein the one or more models are enabled to gain access to the first computational resource by exchanging the one or more tokens for the first computational resource. In particular, once the queue order is established, the system processes requests in sequence, transferring resource tokens to models in exchange for their priority tokens. For example, if an AI model is at the front of the queue and has offered 75 priority tokens for compute resources, the system transfers the requested compute tokens to that model and collects the 75 priority tokens as payment. This token exchange mechanism creates a market-like environment where models can obtain needed resources by offering appropriate compensation in the form of priority tokens. The transferred resource tokens (e.g., compute tokens) give the model the right to access and use the corresponding computational resource. For instance, once a model receives compute tokens, it can exchange these tokens to gain actual CPU or GPU processing time. This two-step process-first obtaining resource tokens through priority token exchange, then using those resource tokens to access actual computational resources-creates a flexible system that can accommodate various resource allocation strategies. The exchange rates between priority tokens and resource tokens can be fixed or dynamic, potentially adjusting based on supply and demand conditions. Thus, during periods of high demand, more priority tokens can be required to obtain the same amount of resource tokens, reflecting the increased competition for limited resources.

The system records, via a distributed ledger, the one or more models involved in the transfer, the one or more tokens transferred to the one or more models, and the number of priority tokens exchanged for the first computational resource. For example, the system maintains a permanent, transparent record of all token transfers and resource allocations using distributed ledger technology. This record includes details about which models were involved in each transaction, what specific tokens were transferred, and how many priority tokens were exchanged. The distributed ledger can be implemented using blockchain technology, which provides benefits such as immutability, transparency, and decentralization. For instance, each token transfer can be recorded as a transaction on a blockchain, with cryptographic verification ensuring that records cannot be altered after the fact. This comprehensive record-keeping serves multiple purposes, including providing audit trails for resource usage, enabling accurate billing and accounting, and creating transparency in the resource allocation process. The distributed nature of the ledger ensures that no single entity controls the record, reducing the risk of manipulation or data loss. Moreover, smart contracts on the blockchain can automate aspects of the token transfer process, ensuring that exchanges follow predefined rules and conditions. Thus, the distributed ledger creates a trustworthy, transparent system for tracking all resource allocation activities within the multi-agent computational environment.

The system can update, in real time, a cost of each token type for the set of computational resources based on at least one of resource utilization, transaction volume, historical pricing, or external demand factors. In some implementations, the system dynamically adjusts the cost or exchange rate of different token types based on current conditions and historical data. For example, if compute resources are becoming heavily utilized (e.g., approaching 90% capacity), the system can increase the cost of compute tokens to reflect the scarcity of this resource. Similarly, if there is a sudden surge in transaction volume for memory tokens, their price can adjust upward to balance supply and demand. The real-time nature of these updates ensures that token prices accurately reflect current market conditions, rather than relying on outdated or static pricing models. The system can consider various factors when updating token costs, including current resource utilization levels (how much of each resource is currently in use), transaction volume (how many tokens are being traded), historical pricing patterns (how prices have fluctuated over time), and external factors such as time of day, scheduled maintenance, or special events that can affect resource demand. For instance, token prices can automatically increase during known peak usage periods or decrease during off-hours to encourage more balanced resource utilization throughout the day. These dynamic pricing mechanisms create economic incentives that can help optimize resource allocation across the system.

Figure 3:
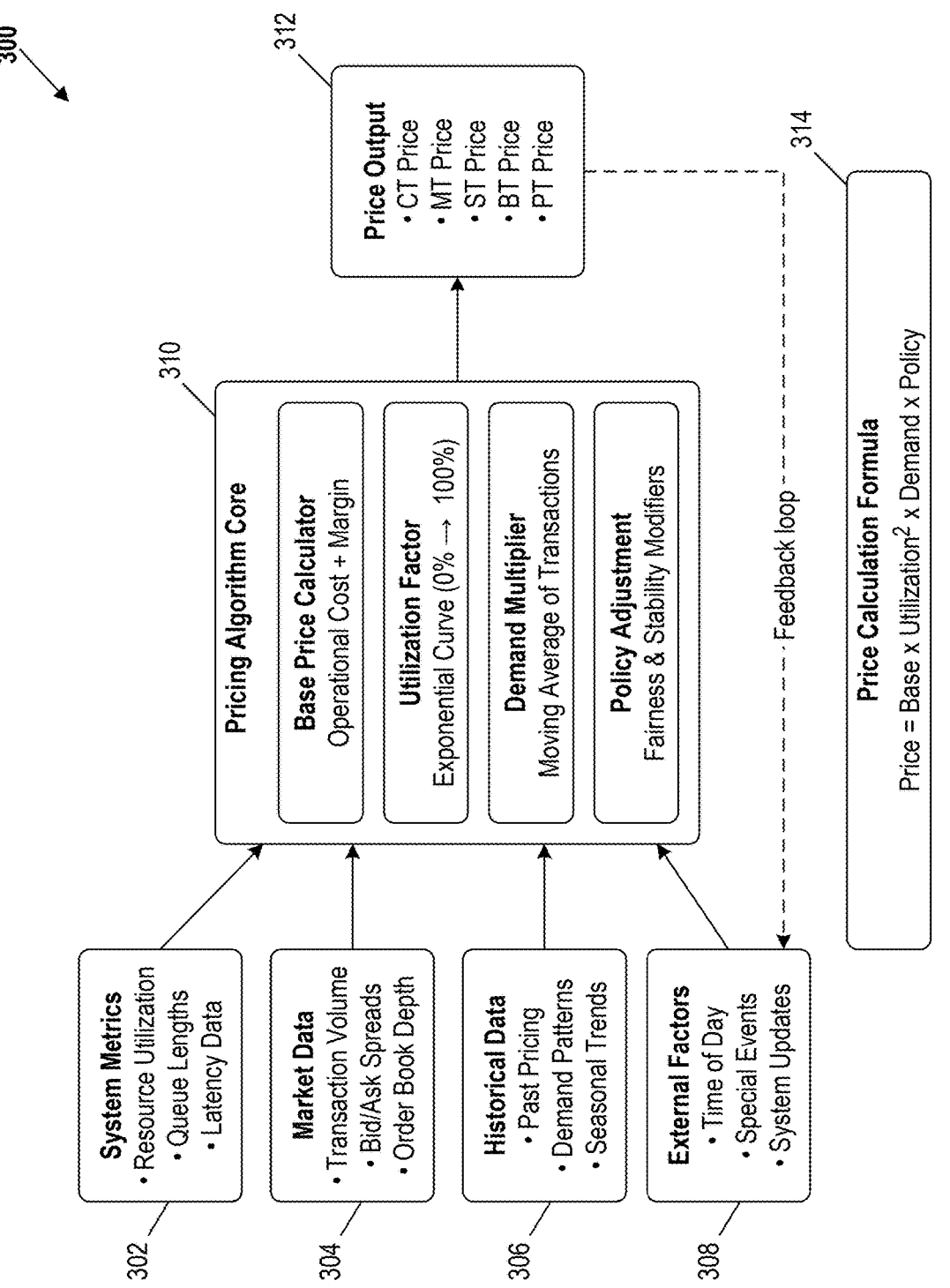
FIG. 3 shows a block diagram of a dynamic pricing system, in accordance with some implementations of the present technology.

FIG. 3 shows a block diagram of a dynamic pricing system 300, in accordance with some implementations of the present technology. The dynamic pricing system 300 includes multiple input components that feed into a pricing algorithm core 310. These input components include system metrics 302, market data 304, historical data 306, and external factors 308. The system metrics 302 provide operational data including resource utilization percentages, queue lengths for different resource types, and latency measurements across the system. For example, the system metrics 302 can track that compute resources are currently at 85% utilization while memory resources are at 40% utilization, providing information for appropriate pricing adjustments. The market data 304 supplies transaction-related information including current transaction volume, bid/ask spreads for different token types, and order book depth measurements. This component enables the system to understand current market conditions, such as detecting when transaction volume for compute tokens has increased by 200% in the last hour, indicating heightened demand.

The historical data 306 contains temporal patterns including past pricing trends, demand patterns over time, and seasonal variations in resource requirements. This historical context allows the system to recognize recurring patterns, such as increased demand for computational resources during certain times of day or specific days of the week. The external factors 308 incorporate contextual information including time of day considerations, scheduled special events that can impact resource demand, and planned system updates or maintenance periods. For instance, the system can account for an upcoming scheduled maintenance window that will temporarily reduce available resources, adjusting prices accordingly in advance.

The pricing algorithm core 310 serves as the central processing component of the dynamic pricing system 300, integrating data from all input sources to calculate appropriate token prices. The pricing algorithm core 310 processes these inputs through several stages including a base price calculator that determines operational costs plus a sustainability margin, a utilization factor that applies an exponential curve from 0% to 100% utilization, a demand multiplier based on moving averages of transaction volumes, and policy adjustments incorporating fairness and stability modifiers. These processing stages work together to ensure that prices reflect both current conditions and system policies. For example, when compute resource utilization approaches 90%, the exponential curve in the utilization factor can significantly increase the price to encourage more efficient resource usage and prevent system overload.

The pricing algorithm core 310 outputs to a price output 312, which generates specific prices for different token types. The price output 312 produces multiple price values including CT Price (for compute tokens), MT Price (for memory tokens), ST Price (for storage tokens), BT Price (for bandwidth tokens), and PT Price (for priority tokens). These differentiated prices reflect the specific supply and demand conditions for each resource type. For instance, if compute resources are in high demand while memory resources are abundant, the CT Price will be higher relative to the MT Price, creating economic incentives for more efficient allocation of scarce compute resources.

A feedback loop connects from the price output 312 back to the external factors 308, allowing the system to adjust based on pricing outcomes. This feedback mechanism enables the system to learn from the effects of previous pricing decisions and refine its approach over time. The system includes a price calculation formula 314 that determines the final price by multiplying the base price by utilization squared, demand, and policy factors. This formula can be expressed as: $Price = Base \times (Utilization)^2 \times Demand \times Policy$. The squared utilization term creates a nonlinear response to increasing resource scarcity, while the demand and policy factors allow for adjustments based on market conditions and system governance requirements. This comprehensive pricing mechanism ensures that resource allocation remains efficient and fair across the multi-agent computational environment.

The system removes tokens of a particular type from circulation based on a model included in the plurality of models consuming a respective computational resource corresponding to the token. For example, when an AI model actually uses or consumes a computational resource, the corresponding tokens are removed from circulation within the system. This token burning or retirement process ensures that tokens accurately represent available resources rather than being infinitely reusable. For instance, if a model exchanges compute tokens to utilize CPU resources for a specific task, those compute tokens are removed from circulation once the resources are consumed. This mechanism creates a direct relationship between tokens and the actual resources they represent, preventing situations where the same resource can be claimed multiple times through token reuse. The token removal can be implemented through various methods, such as sending tokens to a burn address (a blockchain address from which tokens cannot be retrieved), marking tokens as spent in a centralized database, or executing a smart contract that destroys the tokens. The system can implement different token removal policies depending on the nature of the resource. For example, tokens representing consumable resources (like compute time) can be permanently removed, while tokens for reusable resources (like storage that can be freed up later) can be temporarily locked and then reissued when the resource becomes available again. This token removal mechanism helps maintain the integrity of the resource allocation system by ensuring that tokens accurately reflect the actual availability of resources at any given time.

In some implementations, the system maintains a reputation system configured to track reputation scores for models included in the plurality of models based on reliability, performance data, and disputes involving the models included in the plurality of models, and wherein determining access to shared computational resources by the models included in the plurality of models is based at least in part on the reputation scores. In some implementations, the system implements a comprehensive reputation tracking mechanism that evaluates and scores the behavior and performance of AI models over time. These reputation scores serve as indicators of trustworthiness and reliability, influencing how resources are allocated among competing models. The reputation system considers multiple factors when calculating scores. Reliability metrics can include how consistently a model fulfills its resource commitments, whether it returns borrowed resources on time, and if it accurately reports its resource usage. Performance data can encompass metrics such as efficiency of resource utilization, quality of outputs produced with allocated resources, and adherence to service level agreements. Dispute information includes records of conflicts with other models, contested resource allocations, or violations of system policies. For example, if a model frequently overcommits resources it cannot actually provide when sharing with others, this can negatively impact its reputation score. The system uses these reputation scores as factors in resource allocation decisions.

Models with higher reputation scores can receive preferential access to shared resources, better queue positions, or more favorable terms in resource exchanges. For instance, when multiple models request the same scarce resource, those with stronger reputation scores can be prioritized over those with problematic histories. This reputation-based approach creates incentives for models to behave responsibly and efficiently, as maintaining a good reputation directly benefits their ability to access needed resources in the future.

Figure 5:
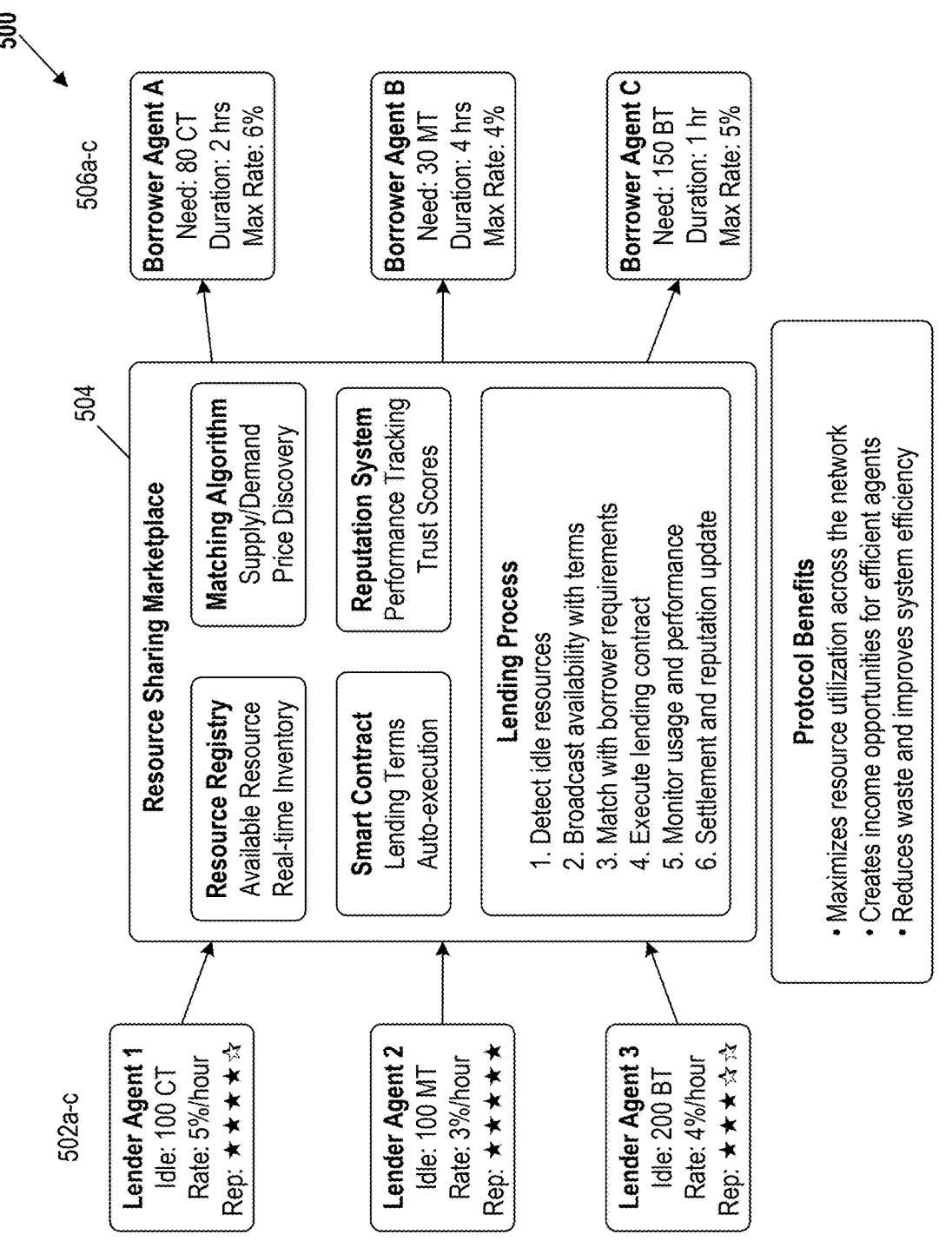
FIG. 5 illustrates a resource sharing system that enables peer-to-peer resource lending mechanisms, in accordance with some implementations of the present technology.

FIG. 5 illustrates a resource sharing system 500 that enables peer-to-peer resource lending mechanisms, in accordance with some implementations of the present technology. The resource sharing system 500 includes multiple interconnected components that facilitate the efficient sharing of computational resources between agents. The system includes lender agents 502*a-c* positioned on the left side, a resource sharing marketplace 504, and borrower agents 506*a-c* on the right side. These components work together to create a comprehensive framework for peer-to-peer resource sharing within a multi-agent computational environment.

The lender agents 502*a-c* represent computational agents that have excess or idle resources available for sharing. Each lender agent displays specific information including the type and quantity of idle resource capacity, the lending rates they are willing to accept, and their reputation scores within the system. For example, lender agent 502*a* can show that it has 100 CT idle, and the reputation is expressed as four stars out of five. These lender agents can include various types of computational entities such as machine learning models that have completed training tasks but still have allocated resources, data processing agents with cyclical workloads that create periods of low utilization, or specialized agents that maintain excess capacity for handling peak demands.

The resource sharing marketplace 504 serves as the central coordination mechanism for the system, facilitating connections between lenders and borrowers while managing the lending process. This marketplace contains several key components including a resource registry that tracks available resources and maintains real-time inventory, a matching algorithm that handles supply/demand coordination and price discovery, a smart contract module that manages lending terms and automatic execution, and a reputation system that handles performance tracking and trust scores. The resource sharing marketplace 504 also implements a structured lending process that outlines the steps from initial idle resource detection through matching, contract formation, resource transfer, monitoring, and finally settlement and reputation updates. For instance, when a lender agent registers available GPU resources, the marketplace can match these with appropriate borrowers, create a smart contract specifying the lending terms, monitor the resource usage during the lending period, and update reputation scores based on whether both parties fulfilled their obligations.

The borrower agents 506*a-c* represent computational agents that need additional resources to complete their tasks. Each borrower agent indicates specific information including the type and quantity of resources needed, the duration requirements for the borrowed resources, and the maximum acceptable rates they are willing to pay. For example, borrower agent 506*a* can indicate that it needs 80 CT for a duration of 2 hours with a maximum rate of 6%. These borrower agents can include various types of computational entities such as machine learning models requiring additional processing power for training operations, data analysis agents handling temporary spikes in workload, or specialized agents needing specific resource types for limited-duration tasks.

The resource sharing system 500 also offers several protocol benefits, as highlighted at the bottom of the diagram. These benefits include the system's ability to maximize resource utilization across the network by ensuring that idle resources can be productively used rather than sitting unused, create income opportunities for agents with excess capacity, and reduce waste by improving the efficiency of resource allocation. The peer-to-peer nature of the system enables direct resource sharing between agents without requiring centralized control, creating a more flexible and responsive resource allocation mechanism that can adapt to changing demands and availability patterns within the multi-agent computational environment.

The system can implement smart contracts that automatically adjust allocation of computational resources among the plurality of models based on real-time system metrics, the real-time system metrics including current system load, historical usage patterns, and predictive models of demand. For example, the system utilizes self-executing code (smart contracts) deployed on a blockchain or distributed ledger to automatically modify resource allocations based on continuously updated system metrics. These smart contracts contain predefined rules and conditions that trigger specific actions when certain thresholds or criteria are met. For instance, a smart contract can automatically reallocate computing resources from lower-priority tasks to higher-priority ones when system load exceeds 80%. The real-time system metrics provide the data inputs that drive these automated adjustments. Current system load metrics indicate the present utilization levels of different resources, such as CPU usage, memory consumption, storage capacity, and network bandwidth. Historical usage patterns provide context for current metrics by showing how resource utilization has typically varied over time, enabling the system to distinguish between normal fluctuations and unusual spikes. Predictive models of demand use techniques such as time series analysis, machine learning, or statistical forecasting to anticipate future resource needs based on historical patterns and current trends. For example, if the system predicts a significant increase in computational demand in the next hour based on historical patterns, smart contracts can proactively adjust resource allocations to prepare for this anticipated surge. This automated, data-driven approach to resource allocation represents a significant improvement over static allocation methods by enabling the system to continuously optimize resource distribution based on changing conditions.

Figure 7:
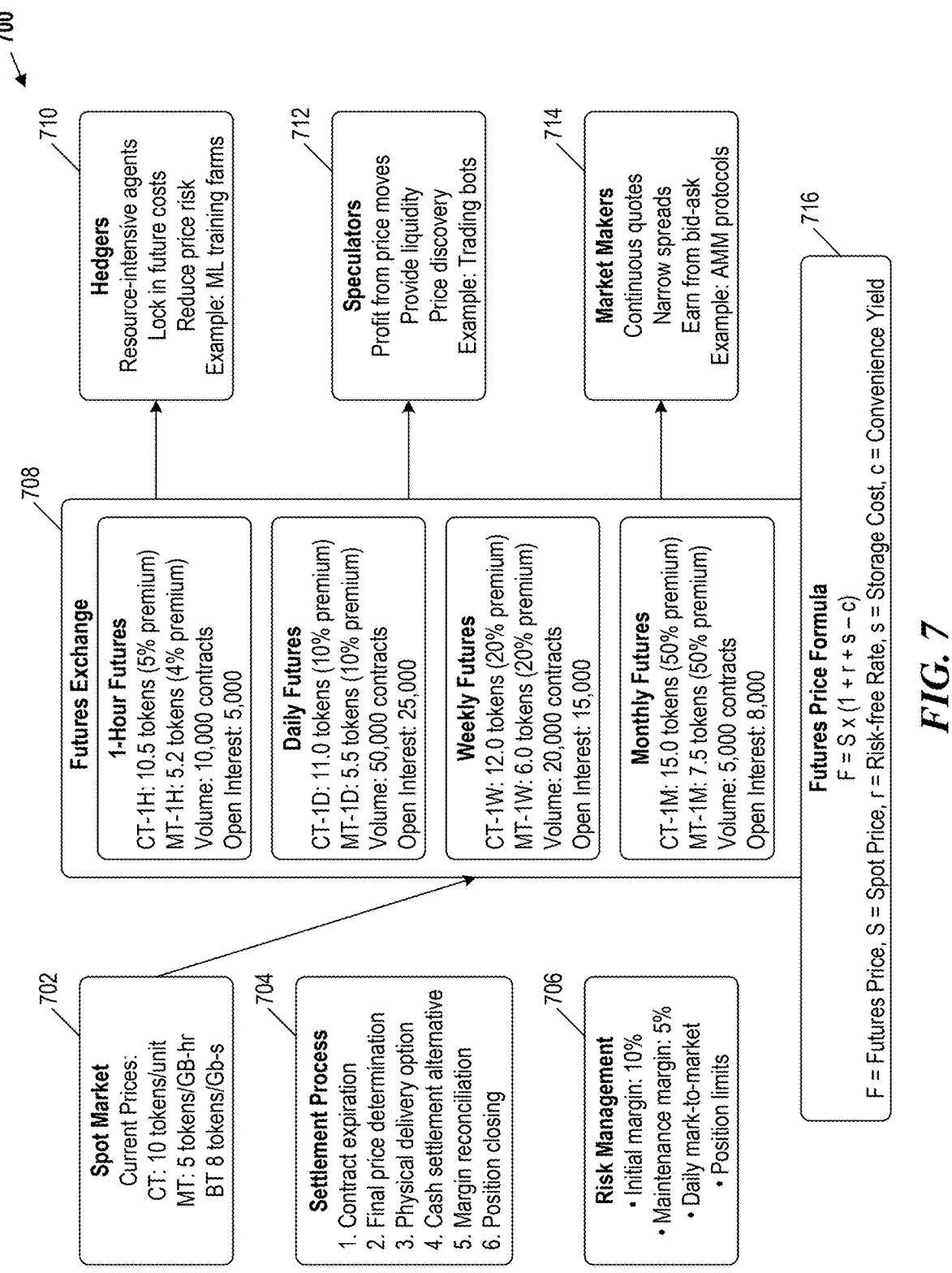
FIG. 7 illustrates a resource futures market system, in accordance with some implementations of the present technology.

FIG. 7 illustrates a resource futures market system 700, in accordance with some implementations of the present technology. The resource futures market system 700 includes multiple interconnected components that work together to facilitate advance planning and allocation of computational resources. The system includes a spot market 702, a settlement process 704, a risk management component 706, a futures exchange 708, participant categories including hedgers 710, speculators 712, and market makers 714, and a futures price formula 716. These components create a comprehensive framework for managing future resource needs within a multi-agent computational environment.

The spot market 702 displays current prices for different token types that represent various computational resources. These include compute tokens (CT) that represent processing power, memory tokens (MT) that represent RAM allocation, and bandwidth tokens (BT) that represent network throughput. Each token type is shown with its current unit price, providing a baseline for futures contract pricing. For example, the spot market 702 can show that compute tokens are currently trading at 10 tokens per unit, while memory tokens are at 5 tokens per GB-hr, and bandwidth tokens are at 8 tokens per GB-s.

The settlement process 704 outlines the procedural steps involved in futures contract completion. This process includes contract expiration that defines when the agreement terminates, final price determination based on market conditions at settlement time, physical delivery options for actual resource allocation, cash settlement alternatives for financial resolution without resource transfer, margin reconciliation to settle outstanding balances, and position closing to finalize the transaction. For instance, when a compute token futures contract expires, the settlement process 704 determines whether the agent receives actual compute resources or a financial settlement based on the difference between the contracted price and the current market price.

The risk management component 706 implements protective measures to maintain system stability. These measures include initial margin requirements of 10% to secure contract participation, maintenance margin of 5% to ensure ongoing contract viability, daily mark-to-market procedures that adjust account balances based on price movements, and position limits that restrict the size of holdings to prevent market concentration. For example, an agent entering into a futures contract for 1000 compute tokens can need to provide an initial deposit of 100 tokens as security, and maintain at least 50 tokens throughout the contract period.

The futures exchange 708 presents different contract types available for trading, organized by time horizon. These include 1-hour futures for immediate resource planning, daily futures for short-term needs, weekly futures for medium-term planning, and monthly futures for long-term resource allocation. Each contract type displays specific token prices with associated premiums, volume information showing trading activity, and open interest data indicating active contract commitments. For instance, the exchange can show that 1-hour compute token futures are trading at 26 units with a 1-unit premium over the spot price, while monthly futures are trading at 30 units with a 5-unit premium, reflecting the increased uncertainty over longer time periods.

The system includes different categories of market participants that fulfill complementary roles. Hedgers 710 represent resource-intensive agents that use futures contracts to secure future computational capacity and stabilize costs. These can include machine learning training operations that need to ensure consistent access to processing power. Speculators 712 are entities that facilitate market liquidity and price discovery by trading based on anticipated resource value changes. These can include specialized trading agents that analyze market trends and system demands. Market makers 714 provide continuous quotes and narrow spreads between buying and selling prices, earning from the difference between bid and ask prices. These can include automated market-making (AMM) protocols that maintain constant availability of trading opportunities.

The futures price formula 716 provides a mathematical expression for calculating theoretical futures prices. The formula expresses the relationship between futures price (F), spot price (S), risk-free rate (r), storage cost (s), and convenience yield (c) through the equation F=S×(1+r+s−c). This formula accounts for the time value of resources, storage costs for maintaining resources, and the benefit of having immediate access to resources. For example, if compute tokens have a spot price of 25 units, a risk-free rate of 2%, storage costs of 1%, and a convenience yield of 0.5%, the theoretical futures price can be 25×(1+0.02+0.01−0.005) =25×1.025=25.625 units.

The interconnections between these components create a comprehensive system for managing future computational resource needs. The resource futures market system 700 enables agents to plan ahead for resource requirements, secure necessary computational capacity in advance, and create more predictable operational environments. This forward-looking approach to resource allocation helps optimize system efficiency by allowing agents to express future needs and resource providers to plan capacity accordingly.

The system enables a first model included in the plurality of models and having idle computational resources to share the idle computational resources with a second model included in the plurality of models in exchange for corresponding tokens. In some implementations, the system facilitates peer-to-peer resource sharing between AI models, allowing models with excess or underutilized resources to temporarily loan these resources to other models that need them. For example, if a machine learning model has completed its training phase and has GPU resources sitting idle, the system enables it to share those resources with another model that requires additional computational power. This sharing is facilitated through a token exchange mechanism, where the borrowing model transfers tokens to the lending model as compensation for the shared resources. The idle resources can include any type of computational asset, such as unused processing power, excess memory allocation, available storage space, or spare network bandwidth. The system can detect idle resources through various methods, such as monitoring resource utilization metrics, receiving explicit notifications from models about available resources, or using predictive algorithms to identify potential future idle periods. The token exchange for shared resources can occur through direct transfers between models or via a centralized marketplace that matches lenders with borrowers. This peer-to-peer sharing mechanism increases overall system efficiency by maximizing resource utilization and creating economic incentives for models to optimize their resource usage. For instance, models can be motivated to complete tasks more efficiently if they can monetize their excess resources by sharing them with others.

Figure 8:
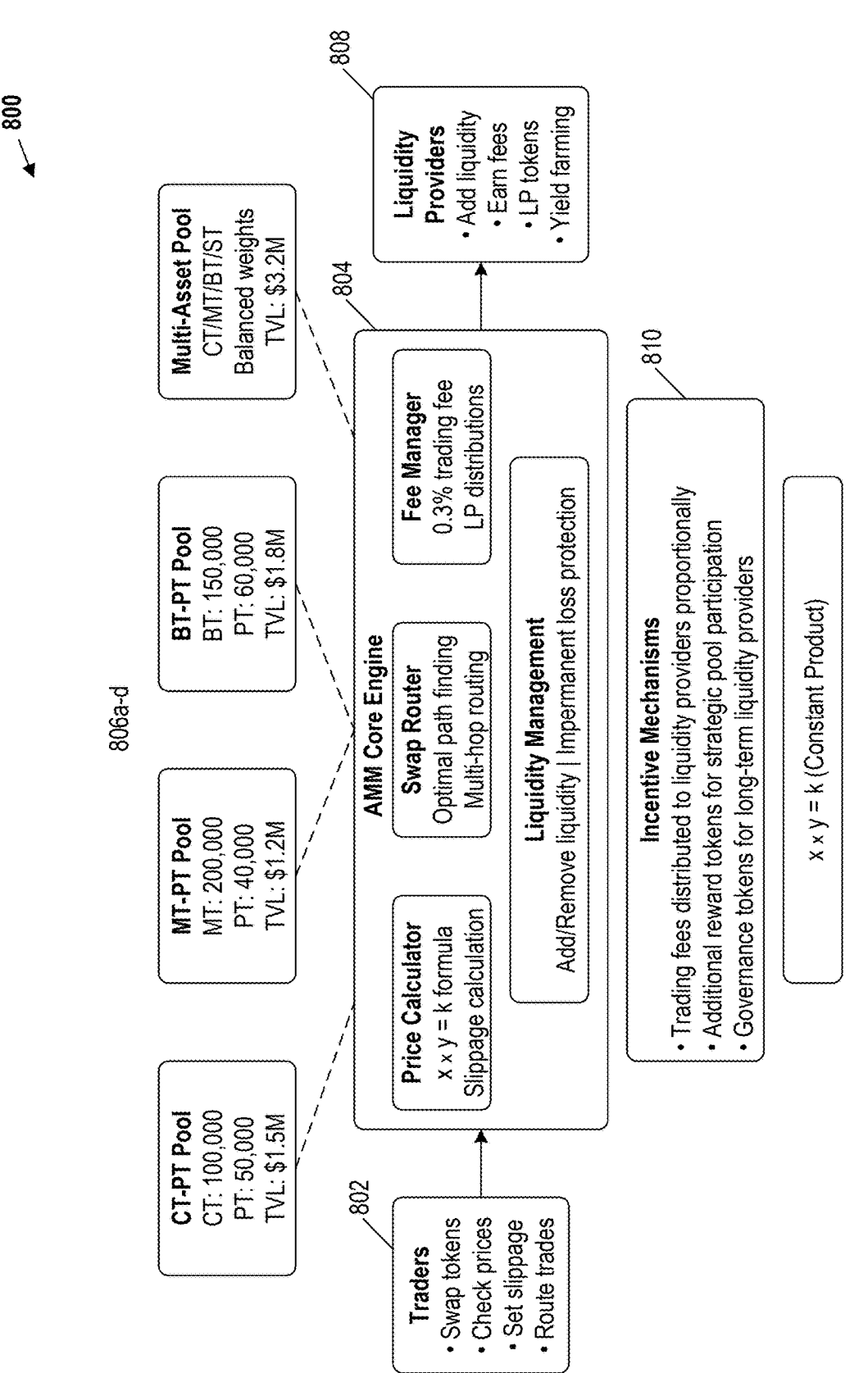
FIG. 8 shows a block diagram of an automated market system, in accordance with some implementations of the present technology.

FIG. 8 illustrates a block diagram of an automated market system 800, in accordance with some implementations of the present technology. The automated market system 800 includes multiple interconnected components that work together to facilitate efficient token exchanges and resource allocation. The system includes traders 802, an AMM core engine 804, token pools 806*a*-d, liquidity providers 808, and incentive mechanisms 810. These components create a comprehensive framework for managing token exchanges within a multi-agent computational environment.

The traders 802 represent computational agents that interact with the automated market system 800 to exchange different token types. These traders can perform various operations including swapping tokens to obtain needed resource types, checking current exchange rates before transactions, setting slippage parameters to control price movement tolerance, and routing trades through preferred paths. For example, an AI agent requiring additional compute resources can swap priority tokens for compute tokens through the system, specifying acceptable slippage limits to ensure the exchange occurs within expected price ranges.

The core engine 804 serves as the central processing component of the automated market system 800, handling all token exchange operations. This engine includes several key modules including a price calculator that determines exchange rates and handles slippage calculations, a swap router that identifies preferred exchange paths and implements multi-hop routing when direct exchanges are suboptimal, and a fee manager that processes transaction fees and distributes them to appropriate participants. The core engine 804 also includes liquidity management functionality that enables adding tokens to or removing tokens from pools and provides protection against temporary value fluctuations during token exchanges. For instance, when an agent requests to exchange memory tokens for compute tokens, the price calculator can determine the appropriate exchange rate based on current pool balances, while the swap router can route the transaction through multiple pools if that provides a more favorable outcome.

The token pools 806*a-d* represent the liquidity reservoirs that enable token exchanges within the system. These pools maintain balances of different token pairs and facilitate exchanges between them. The system includes several specific pools: a CT-PT Pool 806*a* that enables exchanges between compute tokens and priority tokens, an MT-PT Pool 806*b* for memory token and priority token exchanges, a BT-PT Pool 806*c* for bandwidth token and priority token exchanges, and a Multi-Asset Pool 806*d* that supports more complex exchanges involving multiple token types. Each pool maintains specific token balances and tracks its total value locked (TVL), which represents the combined value of all tokens currently in the pool. For example, the CT-PT Pool 806*a* can contain 100,000 compute tokens and 50,000 priority tokens, with a total value locked of $1.5 m.

The liquidity providers 808 are entities that supply tokens to the various pools, enabling the exchange functionality of the system. These providers can add tokens to pools, earn fees from transactions that utilize their contributed liquidity, and receive liquidity provider (LP) tokens that represent their share of the pool. These LP tokens can be used for additional benefits within the system. For instance, a computational agent with excess compute tokens can add them to the CT-PT Pool 806*a*, receiving LP tokens in return and earning a portion of the fees generated when other agents exchange tokens through that pool.

The incentive mechanisms 810 create motivation for participation in the automated market system 800. These mechanisms include fee distribution that allocates transaction fees to liquidity providers proportionally to their contribution, additional reward tokens for strategic pool participation that encourages liquidity in high-demand pools, and governance tokens for long-term liquidity providers that enable participation in system governance decisions. These incentives help ensure sufficient liquidity is available for all token types, maintaining efficient exchange operations. For example, the system can distribute 0.3% of each transaction value as fees to liquidity providers, with additional incentives for providing liquidity to underserved pools.

The automated market system 800 implements a constant product formula ($x \times y = k$) for maintaining price equilibrium in the token pools. This mathematical approach ensures that as tokens are exchanged, the relative value between different token types adjusts automatically based on supply and demand. The formula creates a price curve where larger exchanges cause greater price impact, naturally limiting large-scale market movements and maintaining system stability. This algorithmic approach to price determination eliminates the need for centralized price setting, creating a self-regulating system that responds to actual usage patterns within the multi-agent computational environment.

The interconnections between these components create a comprehensive system for facilitating token exchanges and resource allocation. The automated market system 800 enables computational agents to efficiently obtain the specific resource tokens they need by exchanging other token types, while also providing opportunities for agents with excess resources to contribute to system liquidity and receive compensation. This market-based approach to resource allocation helps optimize overall system efficiency by creating economic incentives that align individual agent behavior with system-wide resource optimization.

Resource Utilization Estimation

In some implementations, the system receives a request from a user. In some implementations, the system receives a prompt from a user. The request or the prompt can indicate one or more computational objectives. In some implementations, the system accepts input from users that specifies desired outcomes, tasks, or goals that require computational processing. This input can take various forms, such as natural language prompts, structured queries, or formal specifications. For example, a user can submit a prompt like "Analyze this quarterly financial report and generate a summary of key trends" or "Process this dataset to identify anomalies and create visualizations." The computational objectives indicated in these prompts represent the end goals that the user wants to achieve, which can require multiple processing steps or AI models working together. The system can interpret these objectives to determine what computational resources and AI capabilities will be needed to fulfill the request. This interpretation process can involve natural language processing to extract key requirements, intent recognition to understand the user's goals, and task decomposition to break complex objectives into manageable subtasks. For instance, a prompt requesting document analysis and summarization can be broken down into separate objectives for text extraction, content analysis, and summary generation. The system can also identify constraints or preferences implied in the prompt, such as time sensitivity, accuracy requirements, or output format specifications. Thus, the prompt serves as the initial input that triggers the subsequent resource allocation and AI model selection processes.

Figure 9:
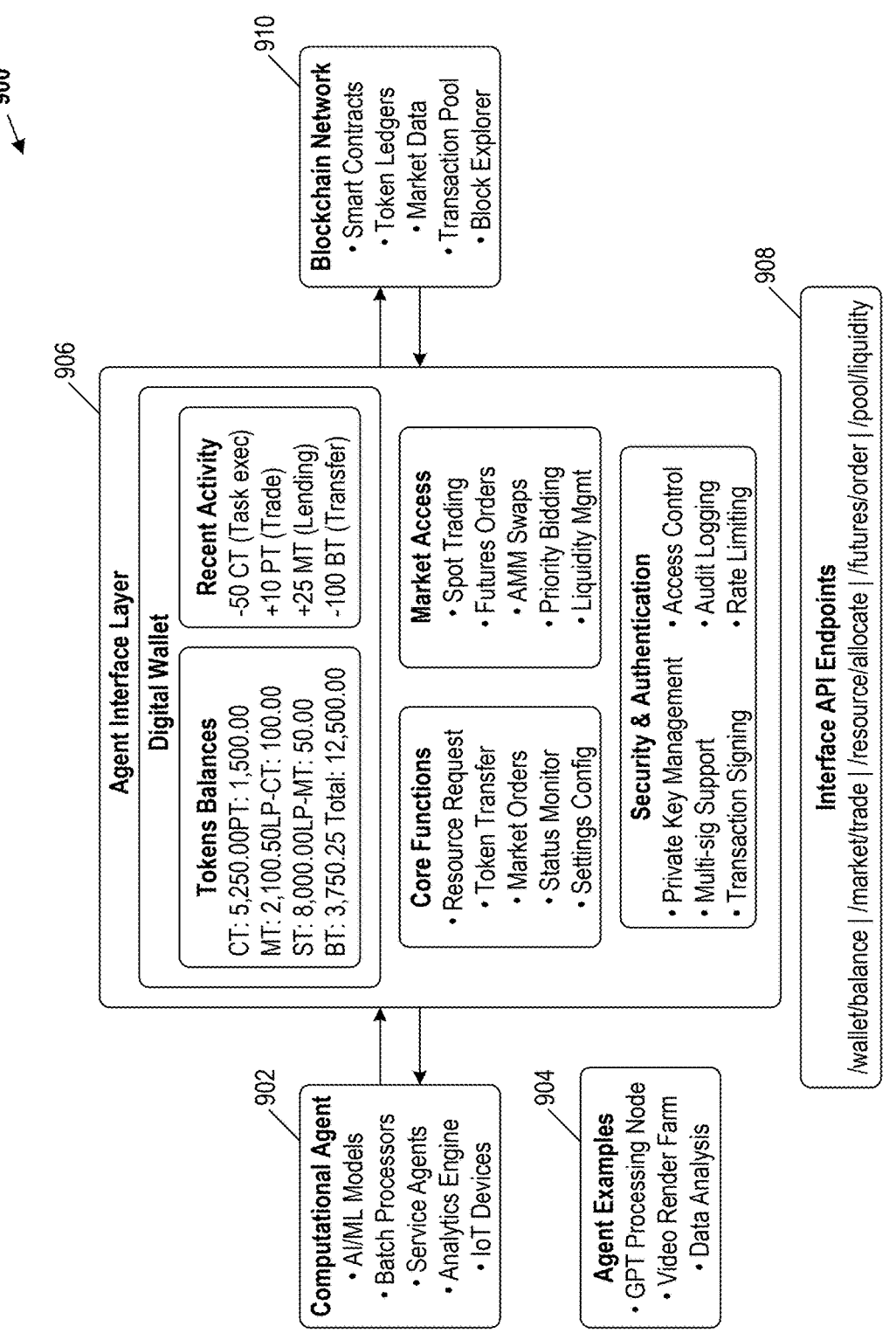
FIG. 9 shows a block diagram of an agent interface system, in accordance with some implementations of the present technology.

FIG. 9 shows a block diagram of an agent interface system 900, in accordance with some implementations of the present technology. The agent interface system 900 includes multiple interconnected components that facilitate interaction between computational agents and the resource allocation infrastructure. The system includes a computational agent 902, which can take the form of agent examples 904 or other types of agents, an agent interface layer 906, interface (application programming interface (API) endpoints 908, and a blockchain network 910. These components work together to create a comprehensive framework for agents to access and utilize computational resources within a multi-agent environment.

The computational agent 902 represents the entity requiring computational resources. This agent can take various forms including AI/ML models that perform machine learning tasks, batch processors that handle scheduled computational workloads, service agents that provide ongoing functionality, analytics engines that process data streams, and Internet of Things (IoT) devices that connect physical systems to the computational infrastructure. For example, a computational agent 902 can be a machine learning model that needs GPU resources to perform training operations, or a data analytics engine that requires memory resources to process large datasets.

The agent interface layer 906 serves as the primary interaction point between computational agents and the resource allocation system. This layer contains several key components including a digital wallet that displays token balances and recent activity, core functions for submitting resource requests and executing market operations, market access features for trading and liquidity management, and security and authentication capabilities. The digital wallet component shows various token balances including CT (compute tokens), MT (memory tokens), ST (storage tokens), and BT (bandwidth tokens), along with their respective values and a total balance. The recent activity section displays transaction history including task execution, trades, lending, and transfers. For instance, the wallet can show that an agent has −50 compute tokens, 10 priority tokens, 25 memory tokens, and −100 bandwidth tokens.

The core functions include capabilities for resource requests where agents can specify their computational needs, token transfers for exchanging resources with other agents, market orders for participating in resource marketplaces, status monitoring for tracking ongoing operations, and settings configuration for customizing agent behavior. The market access section enables spot trading for immediate resource exchanges, futures orders for securing future resource needs, AMM swaps for exchanging different token types, priority bidding for gaining preferential access to resources, and liquidity management for participating in resource pools. The security and authentication section implements private key management for securing agent identities, multi-signature support for enhanced transaction security, transaction signing for verifying operation authenticity, access control for managing permissions, audit logging for tracking all activities, and rate limiting features for preventing system abuse.

The interface API endpoints 908 provide standardized access points for various operations within the system. These endpoints include wallet balance checks for retrieving current token holdings, market trades for executing resource exchanges, resource allocation for requesting computational resources, futures orders for securing future resource needs, and pool liquidity management for participating in shared resource pools. For example, an agent can use the resource allocation endpoint to request 100 compute units for a specific task, or use the market trades endpoint to exchange memory tokens for compute tokens.

The blockchain network 910 serves as the underlying infrastructure that supports all agent interface operations. This network includes smart contracts that automate resource allocation agreements, token ledgers that track ownership of resource tokens, market data that provides information about current resource availability and pricing, a transaction pool that manages pending operations, and block explorer functionality that enables transparent viewing of all system activities. For instance, when an agent requests computational resources, the transaction is recorded on the blockchain network 910, creating a permanent and transparent record of the resource allocation.

The interconnections between these components create a comprehensive system for agents to interact with the resource allocation infrastructure. The agent interface system 900 enables computational agents to seamlessly access needed resources, participate in resource exchanges, and maintain secure control over their resource tokens. This interface-centric approach facilitates efficient resource utilization by providing agents with the tools they need to express their resource requirements and engage with the broader multi-agent computational environment.

Figure 10:
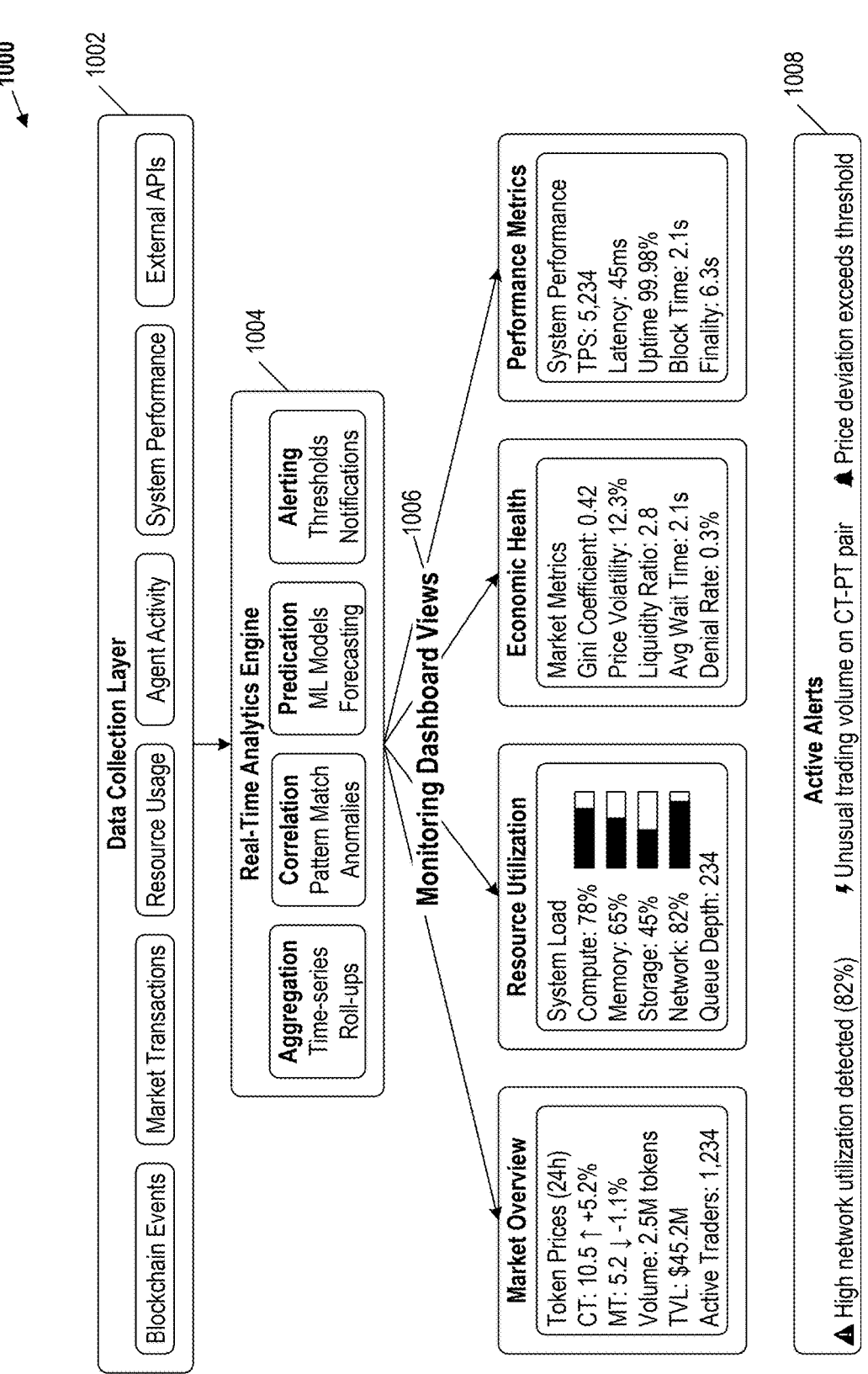
FIG. 10 illustrates a system metrics and monitoring dashboard, in accordance with some implementations of the present technology.

FIG. 10 illustrates a system metrics and monitoring dashboard 1000, in accordance with some implementations of the present technology. The monitoring dashboard 1000 includes multiple interconnected components that work together to track, analyze, and visualize the performance of the resource allocation system. The system includes a data collection layer 1002, a real-time analytics engine 1004, monitoring dashboard views 1006, and an active alert display 1008. These components create a comprehensive framework for monitoring system performance and identifying potential issues within the multi-agent computational environment.

The data collection layer 1002 gathers information from various sources throughout the resource allocation infrastructure. This layer collects data from multiple sources including blockchain events that record token transfers and smart contract executions, market transactions that capture trading activity and price movements, resource usage metrics that track utilization of different computational resources, agent activity logs that document the behavior of computational agents, system performance data that measures operational efficiency, and external APIs that provide contextual information from outside the system. For example, the data collection layer 1002 can gather information about compute token prices, GPU utilization rates, and agent transaction volumes, creating a comprehensive dataset for analysis.

The analytics engine 1004 processes the collected data to extract meaningful insights and identify patterns or anomalies. This engine includes several key components including aggregation functionality that performs time-series roll-ups and statistical summaries, correlation capabilities that identify patterns and detect anomalies across different data streams, prediction modules that utilize machine learning models to forecast future system conditions, and alerting mechanisms that generate notifications based on predefined thresholds and conditions. For instance, the analytics engine 1004 can identify correlations between increased trading volume and subsequent resource utilization spikes, or predict potential resource shortages based on historical usage patterns and current trends.

The dashboard views 1006 provide visual representations of system performance across different domains. These views are organized into four main sections: Market Overview that displays token prices, trading volumes, and market metrics; Resource Utilization that shows current and historical usage of compute, memory, storage, and bandwidth resources; Economic Health that presents key system metrics and ratios indicating overall system stability; and Performance Metrics that track system responsiveness, throughput, and efficiency. Each view contains multiple charts, graphs, and indicators that provide at-a-glance information about different aspects of system performance. For example, the Resource Utilization view can display a real-time chart.

The alert display 1008 shows active system alerts that require attention or intervention. This display presents notifications about unusual or potentially problematic conditions within the system, such as high network utilization that can impact system performance, unusual trading volume that can indicate market manipulation attempts, or price deviation events that suggest market instability. Each alert includes information about the nature of the issue, its severity, and when it was detected. For instance, the alert display 1008 can show a warning about network utilization exceeding 90% for more than 15 minutes, prompting system administrators to investigate potential bottlenecks.

The interconnections between these components create a comprehensive monitoring system that provides real-time visibility into all aspects of the resource allocation infrastructure. The monitoring dashboard 1000 enables administrators and stakeholders to track system performance, identify potential issues before they become critical, and make data-driven decisions about system optimization and resource allocation. This monitoring capability is important for maintaining the efficiency, stability, and fairness of the multi-agent computational environment.

The system determines, based on the request, a plurality of agentic approaches for processing the request, wherein each agentic approach includes a sequence of multiple models configured to process the request and determine, based on the prompt, a plurality of AI agentic approaches for processing the prompt, wherein each AI agentic approach includes a sequence of multiple AI models configured to perform respective sub-tasks required to achieve the one or more computational objectives. For example, the system identifies multiple potential pathways or strategies for fulfilling the user's request, with each pathway involving a specific sequence of AI models working together. An agentic approach represents a comprehensive plan for processing the user's prompt, including which AI models to use, in what order, and how they should interact. Each approach can utilize different combinations of models specialized for various sub-tasks. For instance, to analyze a document and generate a summary, one agentic approach can use a document parsing model followed by a content analysis model and then a summarization model. An alternative approach can use a more comprehensive document understanding model that can handle both analysis and summarization in fewer steps. The system can generate these different approaches through various methods, such as using predefined templates for common request types, dynamically composing model sequences based on the specific requirements in the prompt, or leveraging past successful approaches for similar requests. The determination of potential approaches can consider factors such as the specific capabilities of available AI models, their compatibility with each other, and their suitability for the particular type of request. For example, some approaches can prioritize accuracy by using more specialized models for each sub-task, while others can prioritize speed by using more general models that can handle multiple aspects of the request simultaneously. This multi-approach determination enables the system to consider various ways of accomplishing the same objectives, rather than being limited to a single predefined solution.

The system determines a subset of the plurality of AI agentic approaches, wherein the subset includes AI agentic approaches that comply with one or more operational policies indicating resource allocation constraints. In particular, the system filters the initially identified agentic approaches to include only those that adhere to established operational policies governing resource usage. These operational policies define rules, limits, and guidelines for how computational resources can be allocated and utilized within the system. For example, an operational policy can specify maximum resource consumption limits for certain types of requests, required efficiency thresholds, or restrictions on accessing certain data sources or models. The filtering process evaluates each potential agentic approach against these policy constraints to determine which approaches are viable within the established operational framework. For instance, if a policy specifies that no single request can consume more than 30% of available GPU resources, approaches that can exceed this threshold can be excluded from the subset. The system can implement this filtering through various methods, such as rule-based evaluation, policy compliance checking algorithms, or constraint satisfaction techniques. The resulting subset contains only those agentic approaches that can be executed while remaining within the boundaries defined by the operational policies. This policy-based filtering ensures that all potential approaches under consideration will respect system constraints and governance requirements, preventing the selection of approaches that can violate resource allocation rules or other operational guidelines. The filtering step is important for maintaining system stability and fairness by ensuring that all executed approaches adhere to established resource governance principles.

The resource allocation constraints can include progressive allocation tiers, anti-hoarding measures, minimum resource usage guarantees, and stability controls. For example, the operational policies governing resource allocation include several specific types of constraints designed to ensure fair, efficient, and stable resource distribution. Progressive allocation tiers implement a graduated resource allocation system where access to larger resource amounts comes with increasing costs or requirements. For instance, the first 100 compute units can be available at a base rate, the next 100 at a higher rate, and so on, creating economic incentives for efficient resource usage. Anti-hoarding measures prevent agents or models from reserving more resources than they actually need or holding resources idle for extended periods. These measures can include use-it-or-lose-it policies, where reserved but unused resources are automatically released after a certain time period, or maximum allocation limits that cap how much of any resource a single agent can control. Minimum resource usage guarantees ensure that all agents have access to at least some baseline level of resources, preventing scenarios where a few high-priority agents monopolize all available resources. For example, a policy can specify that 20% of all compute resources must be reserved for small or low-priority tasks, ensuring they can still make progress even during high-demand periods. Stability controls implement mechanisms to prevent rapid fluctuations in resource allocation that can destabilize the system. These can include rate limits on how quickly allocations can change, cooldown periods between major allocation adjustments, or circuit-breaker mechanisms that temporarily freeze allocations during unusual market conditions. Together, these constraints create a comprehensive framework for governing resource allocation in ways that balance efficiency, fairness, and system stability.

The system generates, for each AI agentic approach of the subset, a resource utilization estimate and a performance estimate, wherein the resource utilization estimate represents an anticipated resource consumption of each AI agentic approach and the performance estimate represents a value of an expected output from each AI agentic approach, wherein the resource utilization estimate and the performance estimate are calculated based on an evaluation of the sequence of multiple AI models and the respective sub-tasks involved in each AI agentic approach. For example, the system creates detailed predictions of both the resource requirements and expected performance outcomes for each viable agentic approach. The resource utilization estimate quantifies the computational resources that each approach is likely to consume, including processing power (CPUs/GPUs), memory usage, storage requirements, and network bandwidth. These estimates can be broken down by resource type, duration, and intensity. For instance, an approach can be estimated to require 100 compute units, 50 memory units, and 10 bandwidth units over a 30-minute execution period. The performance estimate evaluates the expected quality, accuracy, or value of the output that each approach is likely to produce. This can include metrics such as prediction accuracy, response completeness, processing speed, or other domain-specific quality indicators. For example, one approach can be estimated to produce results with 95% accuracy, while another can achieve 98% accuracy but require more resources. The system calculates these estimates through various methods, such as historical performance analysis of similar tasks, model benchmarking data, simulation of execution sequences, or predictive modeling based on the characteristics of each AI model in the sequence. The estimates consider not just the individual models but also how they work together in sequence, including factors such as data transfer overhead between models, compatibility issues, or synergistic effects. For instance, if one model produces outputs that are particularly well-suited as inputs to the next model in the sequence, this can improve overall performance beyond what each model can achieve independently. These comprehensive estimates enable informed decision-making about which approach offers the best balance of resource efficiency and output quality.

The system executes, based on the resource utilization estimate and the performance estimate for each AI agentic approach, a particular AI agentic approach of the subset, wherein the particular AI agentic approach optimizes the resource utilization estimate and the performance estimate. In particular, the system selects and implements the most efficient agentic approach from among the viable options, choosing the approach that offers the best balance between resource consumption and expected performance. The optimization process weighs both resource efficiency and output quality to identify the approach that provides the highest value relative to its resource cost. For example, if one approach requires 50% more resources but provides only a 5% performance improvement compared to another approach, the system can select the more resource-efficient option. The execution process involves activating the selected sequence of AI models in the specified order, managing the flow of data between them, and coordinating their operations to achieve the computational objectives. This can include provisioning the necessary computational resources for each model, establishing communication channels between models, monitoring execution progress, and collecting the final outputs. The system can implement various optimization strategies when selecting the best approach, such as maximizing a combined utility function that incorporates both resource efficiency and performance quality, applying user-specified preferences for the relative importance of resource conservation versus output quality, or using multi-objective optimization techniques to find Pareto solutions. For instance, in time-sensitive applications, the system can prioritize approaches that can deliver acceptable results quickly, even if they're not the most resource-efficient over the long term. This optimization-based selection process ensures that the system consistently chooses the most appropriate approach for each specific request, rather than applying a one-size-fits-all solution or simply selecting the approach with the highest raw performance regardless of resource cost.

The system records, via a distributed ledger, the particular AI agentic approach, the resource utilization estimate, and the performance estimate. For example, the system maintains a permanent, transparent record of the selected approach and its associated estimates using distributed ledger technology. This record captures which specific agentic approach was chosen for execution, what resources it was estimated to consume, and what performance level it was expected to achieve. The distributed ledger can be implemented using blockchain technology, which provides benefits such as immutability, transparency, and decentralization.

For example, each execution decision can be recorded as a transaction on a blockchain, with cryptographic verification ensuring that records cannot be altered after the fact. This comprehensive record-keeping serves multiple purposes, including providing audit trails for decision-making processes, enabling performance analysis by comparing actual outcomes to estimates, and creating accountability for resource allocation decisions. The distributed nature of the ledger ensures that no single entity controls the record, reducing the risk of manipulation or data loss. Moreover, smart contracts on the blockchain can automate aspects of the record-keeping process, ensuring that all relevant information is captured consistently. The system can also record actual resource consumption and performance metrics after execution completes, allowing for comparison between estimates and actual results. This comparison data can be valuable for improving the accuracy of future estimates and refining the approach selection process over time. Thus, the distributed ledger creates a trustworthy, transparent system for tracking all aspects of the agentic approach selection and execution process.

The system receives, from a plurality of models included in the particular AI agentic approach, requests for expedited access to resources using priority tokens. In some implementations, once execution of the selected agentic approach begins, the individual AI models within that approach can request faster or preferential access to resources by offering priority tokens. These requests indicate that certain models need resources more urgently than others, perhaps due to time-sensitive processing requirements or dependencies where other models are waiting for their outputs. For example, a natural language processing model within an agentic approach can request expedited access to GPU resources by offering 50 priority tokens, indicating the importance of completing its processing quickly. The priority tokens serve as a signaling mechanism that allows models to express the relative urgency or importance of their resource needs. Models with more time-critical functions can offer more priority tokens to gain faster access to needed resources. The system can implement various mechanisms for handling these expedited access requests, such as priority queues where higher token offers receive better queue positions, auction systems where resources are allocated to the highest bidders, or reservation systems where models can pre-book resources by committing priority tokens in advance. This priority token mechanism creates a flexible, market-based approach to resource allocation within the executing agentic approach, allowing the system to dynamically adjust resource distribution based on the changing needs and priorities of different models in the sequence. The ability for models to request expedited access helps optimize overall execution efficiency by ensuring that important or bottleneck models receive the resources they need to complete their tasks promptly.

The system manages queue positions for the plurality of models via automated scheduling algorithms. For example, the system uses sophisticated algorithms to organize and prioritize the resource requests from different models within the executing agentic approach. These scheduling algorithms determine the order in which models receive access to requested resources, balancing factors such as priority token offers, task dependencies, and overall execution efficiency. The automated scheduling can implement various queue management strategies, such as first-come-first-served with priority overrides, deadline-based scheduling where models with approaching time constraints receive preference, or dependency-aware scheduling that prioritizes models whose outputs are needed by multiple downstream models. For instance, if multiple models are waiting for GPU resources, the scheduling algorithm can prioritize a model that has offered more priority tokens, but also consider whether that model's output is needed by several other waiting models. The automation of this scheduling process enables rapid, consistent decision-making about resource allocation without requiring manual intervention. The scheduling algorithms can continuously optimize queue positions as conditions change, such as when new requests arrive, priority token offers are updated, or resource availability fluctuates. This dynamic queue management helps maximize the overall efficiency of the agentic approach execution by ensuring that resources are allocated in ways that minimize bottlenecks and idle time. The automated nature of these scheduling decisions also provides scalability, allowing the system to handle large numbers of competing resource requests across multiple executing agentic approaches simultaneously.

Returning to FIG. 4, the priority queue marketplace system 400 can manage queue positions for the plurality of models. For example, the agent modules 402a-d represent computational agents that submit resource requests with varying priority levels. Each agent module specifies different bid amounts using priority tokens (PT) and indicates the type of computational task requiring resources. The bidding engine 404 serves as the central processing component for all resource requests and priority bids. The system implements a tiered queuing structure with three levels that organize resource requests based on their priority token bids. The resource execution processor 412 manages the actual allocation and utilization of computational resources based on the queue priorities. The marketplace rules module 414 establishes the governance framework for the entire priority queue system. This module defines key operational principles that ensure fair and efficient resource allocation.

The system enables one or more models included in the particular AI agentic approach and having idle computational resources to share the idle computational resources with other models included in the particular AI agentic approach in exchange for resource tokens. In some implementations, the system facilitates resource sharing between models within the same executing agentic approach, allowing models that have completed their tasks or are waiting for inputs to temporarily loan their allocated resources to other models that need additional capacity. For example, if a document analysis model has finished processing but still has allocated GPU resources, it can share those resources with a summarization model that needs additional computational power to complete its task more quickly. This sharing is facilitated through a token exchange mechanism, where the borrowing model transfers resource tokens to the lending model as compensation for the shared resources. The idle resources can include any type of computational asset, such as unused processing power, excess memory allocation, available storage space, or spare network bandwidth.

The system can detect idle resources through various methods, such as monitoring resource utilization metrics, receiving explicit notifications from models about available resources, or using predictive algorithms to identify potential future idle periods. This intra-approach sharing mechanism increases overall execution efficiency by maximizing resource utilization and reducing bottlenecks. For instance, if one model in the sequence is particularly resource-intensive, it can potentially borrow resources from other models that have lighter requirements, enabling it to complete its processing more quickly and avoid becoming a bottleneck for the entire approach. The token-based exchange creates economic incentives for models to optimize their resource usage and share excess capacity, as they can receive compensation for resources they don't currently need.

The system implements a resource allocation platform configured to enable models included in the particular AI agentic approach to enter into standardized contracts for computational resources required to perform the respective sub-tasks, each contract specifying a resource type, an expiration period, and a settlement method. For example, the system provides a structured framework for models to secure the resources they need through formalized agreements with specific terms and conditions. These standardized contracts create clear, consistent mechanisms for resource allocation and usage within the executing agentic approach. Each contract explicitly defines the type of resource being allocated, such as CPU processing power, GPU acceleration, memory allocation, storage space, or network bandwidth. The expiration period establishes the time frame during which the model has rights to the specified resources, after which the resources are released back to the system or re-contracted. The settlement method details how the model will compensate for the resources, typically through token transfers but potentially including other mechanisms such as resource exchanges or credits.

For example, a machine learning model can enter into a contract for 100 GPUs for a 2-hour period, with settlement occurring through an immediate transfer of compute tokens. The standardized nature of these contracts ensures consistency and reduces complexity in resource allocation, while still allowing for customization of specific terms to meet the needs of different models and sub-tasks. The system can implement these contracts through various technologies, such as smart contracts on a blockchain that automatically execute and enforce the agreed terms. This contract-based approach creates a clear, transparent framework for resource allocation that helps ensure all models within the agentic approach have access to the resources they need when they need them, while also providing mechanisms for addressing disputes or conflicts over resource usage.

Figure 6:
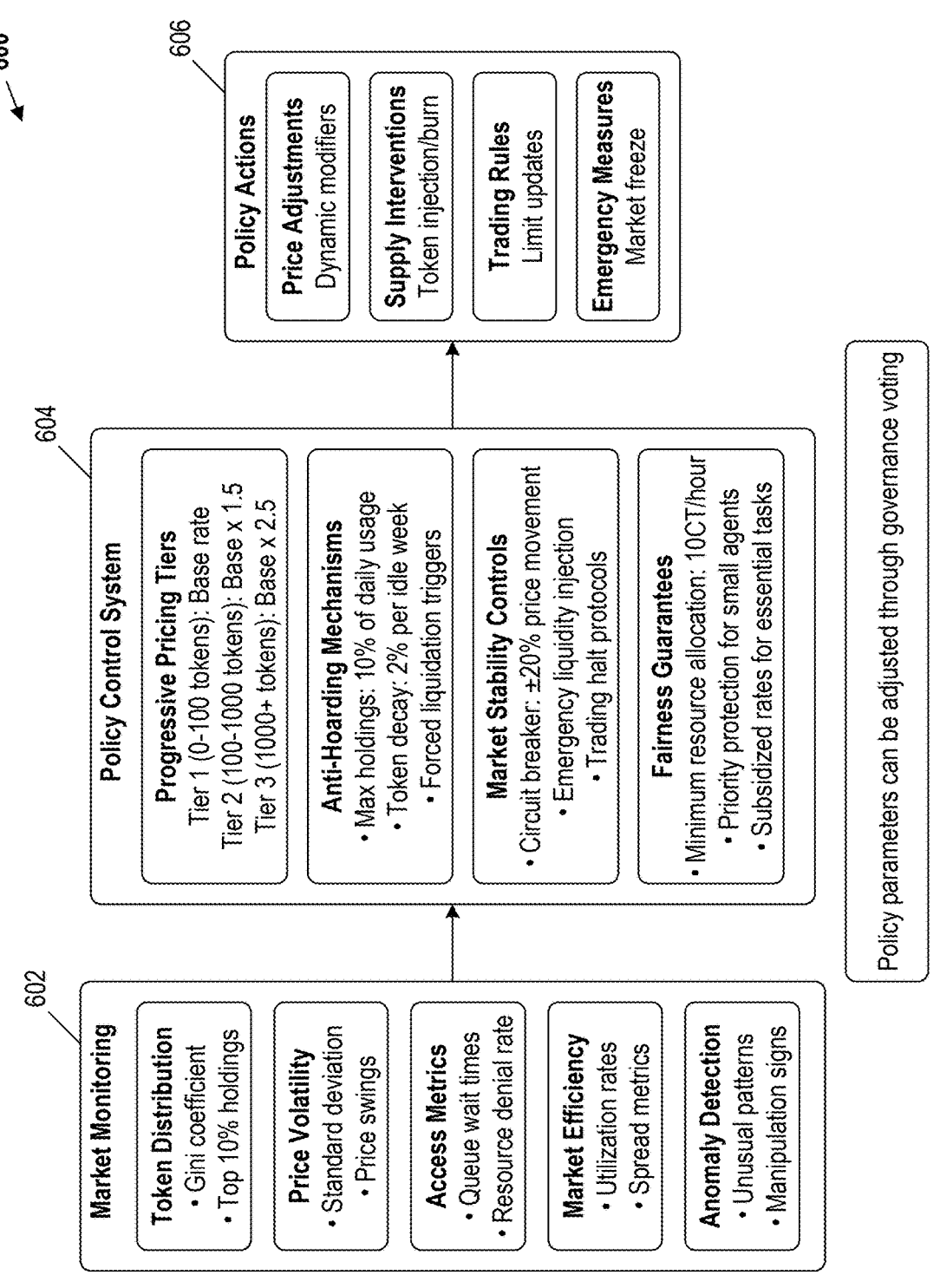
FIG. 6 shows a block diagram of an economic policy system, in accordance with some implementations of the present technology.

FIG. 6 shows a block diagram of an economic policy system 600, in accordance with some implementations of the present technology. The economic policy system 600 includes multiple interconnected components that work together to monitor, control, and implement resource allocation policies within a multi-agent computational environment. The system includes market monitoring 602, a policy control system 604, and policy actions 606 arranged in a sequential flow configuration that enables comprehensive governance of resource allocation mechanisms. The market monitoring component 602 serves as the observational foundation of the economic policy system 600, continuously gathering and analyzing data about system operations. This component includes several specialized monitoring functions that provide comprehensive visibility into different aspects of the resource allocation environment.

The token distribution analysis function tracks resource concentration patterns using metrics such as the Gini coefficient, which quantifies inequality in token holdings, and top 10% holdings measurements that identify potential resource concentration issues. For example, if the monitoring system detects that 80% of compute tokens are held by just 10% of agents, this can trigger policy interventions to promote more equitable distribution. The price volatility tracking function monitors stability through standard deviation calculations and price swing measurements, enabling the system to identify periods of unusual price fluctuation that can indicate system instability. The access metrics monitoring function evaluates fairness through queue wait times and resource denial rates, ensuring that all agents maintain appropriate access to computational resources regardless of their size or priority level. The market monitoring component 602 also includes market efficiency evaluation capabilities that track utilization rates and spread metrics to ensure efficient resource allocation. For instance, this function can detect when compute resources are consistently underutilized during certain time periods, suggesting potential inefficiencies in the allocation system.

The anomaly detection function employs advanced pattern recognition techniques to identify unusual system behaviors or potential manipulation attempts, such as coordinated bidding patterns that can artificially inflate resource prices. Together, these monitoring functions create a comprehensive surveillance system that continuously evaluates the health, fairness, and efficiency of the resource allocation marketplace, providing data inputs for policy decisions. The policy control component 604 establishes the rules and mechanisms that govern resource allocation within the system. This component implements multiple control strategies designed to maintain system stability, fairness, and efficiency. The progressive pricing tiers mechanism creates graduated resource costs based on usage volume, with different token thresholds triggering different pricing multipliers. For example, the first 100 compute units can be available at a base rate, while additional units come at progressively higher rates, creating economic incentives for efficient resource usage. The anti-hoarding mechanisms prevent excessive resource concentration through maximum holdings limits and token decay rates that gradually reduce the value of unused tokens over time. For instance, if an agent accumulates more than a specified threshold of memory tokens without using them, these mechanisms can automatically begin reducing the tokens' value to discourage speculative hoarding.

The policy control component 604 also implements market stability controls that include circuit breakers and emergency protocols designed to prevent extreme price volatility or system disruptions. These controls can automatically pause trading or resource allocation during periods of unusual activity, allowing the system to stabilize before resuming normal operations. The fairness guarantees establish minimum resource allocations and priority protections that ensure all agents maintain access to computational resources regardless of market conditions. For example, these guarantees can reserve 20% of all compute resources for small or low-priority tasks, ensuring they can still make progress even during high-demand periods. Together, these control mechanisms create a comprehensive framework for governing resource allocation in ways that balance efficiency, fairness, and system stability. The policy actions component 606 implements the specific interventions and adjustments needed to maintain system performance based on data from the monitoring component and guidelines from the control component. This component includes various regulatory actions that can be deployed automatically or through governance decisions. The price adjustments function implements dynamic modifiers that can increase or decrease the cost of different resource tokens based on current market conditions. For instance, if memory resources are becoming heavily utilized, the system can temporarily increase memory token prices to encourage more efficient usage.

The supply interventions function manages token availability through token injection or burning operations that expand or contract the total supply of different token types. These interventions can help stabilize prices during periods of unusual demand or supply fluctuations. The policy actions component 606 also includes trading rules updates that modify the operational parameters of the resource marketplace, such as adjusting minimum bid requirements or changing queue prioritization algorithms. The emergency measures function provides capabilities for addressing severe system disruptions, including market freeze functionality that can temporarily halt all resource allocation activities during critical situations. The system includes a notation indicating that policy parameters can be adjusted through governance voting, allowing for system adaptation based on market conditions and stakeholder input. This democratic approach to policy management ensures that the system can evolve over time to address changing needs and conditions within the multi-agent computational environment. The sequential flow design of the economic policy system 600 creates a continuous feedback loop where market conditions are monitored, policy controls are applied, and specific actions are implemented to maintain system performance.

This integrated approach enables the system to respond dynamically to changing conditions while maintaining consistent governance principles. For example, if the market monitoring component 602 detects increasing concentration of compute resources among a small number of agents, this information flows to the policy control component 604, which can activate anti-hoarding mechanisms. These mechanisms then trigger specific actions through the policy actions component 606, such as implementing token decay for large holdings or adjusting pricing tiers to discourage excessive accumulation. This responsive governance approach helps maintain a balanced, efficient, and fair resource allocation environment for all participants in the multi-agent computational system.

The system operates a reputation system configured to track reputation scores of models included in the particular AI agentic approach based on reliability, performance data, and disputes involving the models included in the particular AI agentic approach, and wherein access to shared resources by the models included in the particular AI agentic approach is determined at least in part by the reputation scores. In some implementations, the system maintains a comprehensive evaluation mechanism that assesses and scores the behavior and performance of AI models over time. These reputation scores serve as indicators of trustworthiness and reliability, influencing how resources are allocated among models within the executing agentic approach. The reputation system considers multiple factors when calculating scores. Reliability metrics can include how consistently a model fulfills its processing commitments, whether it completes tasks within expected timeframes, and if it accurately reports its resource usage. Performance data can encompass metrics such as output quality, processing efficiency, and adherence to expected behavior patterns. Dispute information includes records of conflicts with other models, contested resource allocations, or violations of system policies. For example, if a model frequently overestimates its resource needs and then leaves allocated resources idle, this can negatively impact its reputation score.

The system uses these reputation scores as factors in resource allocation decisions within the agentic approach. Models with higher reputation scores can receive preferential access to shared resources, better queue positions, or more favorable terms in resource exchanges. For instance, when multiple models request access to a limited pool of shared GPU resources, those with stronger reputation scores can be prioritized over those with problematic histories. This reputation-based approach creates incentives for models to behave responsibly and efficiently, as maintaining a good reputation directly benefits their ability to access needed resources in the future. The reputation system also provides valuable information for improving future agentic approaches by identifying which models consistently perform well and which can need refinement or replacement. Methodologies for Resource Utilization Estimation and Allocation FIG. 11A shows a flowchart of a method 1100 for facilitating access to computational resources by agents, in accordance with some implementations of the present technology. In some implementations, method 1100 can be performed by a system including components of the agent resource allocation system architecture 100 illustrated and described in more detail with reference to FIG. 1. The system can be implemented on a distributed computing environment, blockchain infrastructure, or cloud-based platform. Implementations can include different and/or additional operations or can perform the operations in different orders.

In step 1102, the system determines that a set of computational resources is available for consumption by a plurality of models. The computational resources can include various types of computing assets such as processing power, memory, storage capacity, and network bandwidth that are available within the distributed computing environment. For example, the system can identify that a computing cluster has 1000 CPU cores, 500 GB of available memory, 10 TB of storage capacity, and 100 Gbps of network bandwidth available for allocation among various AI models. The system can determine resource availability through various methods, such as monitoring resource utilization metrics, receiving notifications from resource providers, or querying a centralized resource management system. In some implementations, the system can continuously monitor resource pools and update availability information in real time as resources are consumed or released by different models. The plurality of models can represent various types of AI systems including machine learning models, data processing agents, analytical engines, or specialized computational services that require access to shared computational infrastructure.

In step 1104, the system generates a set of tokens of corresponding token types for the set of computational resources. The token generation process creates digital representations of the available resources, where each token type corresponds to a specific resource category. For example, the system can generate compute tokens (CT) that represent processing power, memory tokens (MT) that represent RAM allocation, storage tokens (ST) that represent disk space, and bandwidth tokens (BT) that represent network throughput. The system can implement various token generation strategies, such as minting tokens based on real-time resource availability, creating tokens through smart contracts that automatically adjust supply based on demand, or issuing tokens according to predefined allocation policies that ensure fair distribution among system participants. In some implementations, the token generation process can include creating priority tokens (PT) that serve as a signaling mechanism allowing models to indicate the urgency or importance of their resource needs. The tokens can be managed through a blockchain infrastructure that provides distributed ledger capabilities, smart contract functionality, and transaction processing to ensure the integrity of all token operations.

In step 1106, the system receives a set of requests, from a set of models of the plurality of models, to access a first computational resource of the set of computational resources. Each request can include specific information about the resource needed, the quantity required, the duration of use, and a number of priority tokens associated with the request. For example, an AI model performing machine learning inference can submit a request for GPU resources along with 75 priority tokens, while another model handling batch processing can include only 25 priority tokens with its request. The priority tokens serve as a bidding mechanism that allows models to express their willingness to pay higher costs for faster access to needed resources. In some implementations, the requests can include additional metadata such as expected completion time, resource usage patterns, or compatibility requirements that help the system optimize resource allocation decisions. The system can validate incoming requests to ensure they meet formatting requirements, contain valid token amounts, and comply with system policies before adding them to the processing queue.

In step 1108, the system determines a queue of the set of requests. In some implementations, an order of the queue is based on the number of priority tokens associated with each request. The queuing mechanism creates a fair and transparent method for prioritizing resource allocation based on the stated importance of each request. For example, requests with higher-priority token counts are placed ahead of those with lower counts, ensuring that more urgent tasks receive preferential treatment. The system can implement multiple queue tiers, such as premium queues for requests with 100+ priority tokens, standard queues for requests with 50-99 tokens, and economy queues for requests with fewer than 50 tokens, creating structured access levels that balance efficiency with fairness. In some implementations, the queue order can be dynamically updated as new requests arrive, with higher-priority requests potentially moving ahead of already-queued lower-priority requests. The system can employ various queue management algorithms including first-come-first-served with priority overrides, deadline-based scheduling, or dependency-aware scheduling that considers relationships between different resource requests.

In step 1110, the system performs, based on the order of the queue, a transfer of one or more tokens of a first type corresponding to the first computational resource to one or more models of the set of models. In some implementations, the system performs the transfer in exchange for the number of priority tokens associated with each respective request. This token exchange mechanism creates a market-like environment where models can obtain needed resources by offering appropriate compensation in the form of priority tokens. For example, when a model reaches the front of the queue and has offered 75 priority tokens for compute resources, the system transfers the requested compute tokens to that model and collects the 75 priority tokens as payment. The transferred resource tokens give the model the right to access and use the corresponding computational resource, creating a two-step process whereby models first obtain resource tokens through priority token exchange, and then use those resource tokens to access actual computational resources. In some implementations, the exchange rates between priority tokens and resource tokens can be fixed or dynamic, potentially adjusting based on supply and demand conditions to reflect the current scarcity or abundance of different resource types.

In step 1112, the system records, via a distributed ledger, the one or more models involved in the transfer and the one or more tokens transferred to the one or more models. In some implementations, the system further records the number of priority tokens exchanged for the first computational resource. The distributed ledger maintains a permanent, transparent record of all token transfers and resource allocations using blockchain technology or similar distributed ledger systems. For example, each token transfer can be recorded as a transaction on the blockchain, with cryptographic verification ensuring that records cannot be altered after the fact. This comprehensive record-keeping serves multiple purposes, including providing audit trails for resource usage, enabling accurate billing and accounting, creating transparency in the resource allocation process, and supporting performance analysis by tracking allocation patterns over time. In some implementations, smart contracts on the blockchain can automate aspects of the token transfer process, ensuring that exchanges follow predefined rules and conditions while maintaining immutable records of all system activities. The distributed nature of the ledger ensures that no single entity controls the record, reducing the risk of manipulation or data loss while creating a trustworthy foundation for the entire resource allocation system.

FIG. 11B shows a flowchart of a method 1150 for routing execution requests to autonomous AI agents, in accordance with some implementations of the present technology. In some implementations, method 1150 can be performed by a system including components of the agent resource allocation system architecture 100 illustrated and described in more detail with reference to FIG. 1. The system can be implemented on a distributed computing environment, blockchain infrastructure, or cloud-based platform. Implementations can include different and/or additional operations or can perform the operations in different orders.

In step 1152, the system receives a request from a user. The request can serve as the initial input that triggers the agentic approach selection and resource allocation process. For example, the request can take various forms such as natural language prompts, structured queries, or formal specifications that indicate desired computational objectives. The system can preprocess incoming requests through natural language processing, intent recognition, and task decomposition to extract key requirements and constraints. In some implementations, the system can support multiple input formats and can implement validation mechanisms to ensure requests meet formatting requirements and contain sufficient information for processing. The system can also provide real-time feedback to users about request clarity or potential issues before proceeding with analysis.

In step 1154, the system determines, based on the request, a plurality of agentic approaches for processing the request. In some implementations, each agentic approach includes a sequence of multiple models configured to process the request. The system can identify multiple potential pathways or strategies for fulfilling the user's request, with each pathway involving a specific sequence of AI models working together. For example, to analyze a document and generate a summary, one agentic approach can use a document parsing model followed by a content analysis model and then a summarization model, while an alternative approach can use a more comprehensive document understanding model that can handle both analysis and summarization in fewer steps. The system can generate these different approaches through various methods, such as using predefined templates for common request types, dynamically composing model sequences based on specific requirements, or leveraging past successful approaches for similar requests. The determination process can consider factors such as the specific capabilities of available AI models, their compatibility with each other, and their suitability for the particular type of request.

In step 1156, the system determines a subset of the plurality of agentic approaches, wherein the subset includes agentic approaches that comply with one or more operational policies. The operational policies can indicate resource allocation constraints. The system can filter the initially identified agentic approaches to include only those that adhere to established operational policies governing resource usage. For example, operational policies can specify maximum resource consumption limits for certain types of requests, required efficiency thresholds, or restrictions on accessing certain data sources or models. The filtering process can evaluate each potential agentic approach against these policy constraints through rule-based evaluation, policy compliance checking algorithms, or constraint satisfaction techniques. In some implementations, the resource allocation constraints can include progressive allocation tiers, anti-hoarding measures, minimum resource usage guarantees, and stability controls that ensure fair and efficient resource distribution across all system participants.

In step 1158, the system generates, for each agentic approach of the subset, a resource utilization estimate and a performance estimate. In some implementations, the resource utilization estimate represents an anticipated resource consumption of each agentic approach and the performance estimate represents a value of an expected output from each agentic approach. The system can create detailed predictions of both the resource requirements and expected performance outcomes for each viable agentic approach. For example, the resource utilization estimate can quantify computational resources including processing power, memory usage, storage requirements, and network bandwidth that each approach is likely to consume, while the performance estimate can evaluate expected quality, accuracy, or value of the output. The system can calculate these estimates through various methods, such as historical performance analysis of similar tasks, model benchmarking data, simulation of execution sequences, or predictive modeling based on the characteristics of each AI model in the sequence. The estimates can consider not just individual models but also how they work together in sequence, including factors such as data transfer overhead between models, compatibility issues, or synergistic effects.

In step 1160, the system executes, based on the resource utilization estimate and the performance estimate for each agentic approach, a particular agentic approach of the subset. The particular agentic approach can optimize the resource utilization estimate and the performance estimate. The system can select and implement the most efficient agentic approach from among the viable options, choosing the approach that offers the best balance between resource consumption and expected performance quality. For example, if one approach requires 50% more resources but provides only a 5% performance improvement compared to another approach, the system can select the more resource-efficient option. The execution process can involve activating the selected sequence of AI models in the specified order, managing the flow of data between them, and coordinating their operations to achieve the computational objectives. The system can implement various optimization strategies when selecting the best approach, such as maximizing a combined utility function that incorporates both resource efficiency and performance quality or applying user-specified preferences for the relative importance of resource conservation versus output quality.

In step 1162, the system records, via a distributed ledger, the particular agentic approach, the resource utilization estimate, and the performance estimate. The system can maintain a permanent, transparent record of the selected approach and its associated estimates using distributed ledger technology. For example, each execution decision can be recorded as a transaction on a blockchain, with cryptographic verification ensuring that records cannot be altered after the fact. This comprehensive record-keeping can serve multiple purposes, including providing audit trails for decision-making processes, enabling performance analysis by comparing actual outcomes to estimates, and creating accountability for resource allocation decisions. In some implementations, the system can also record actual resource consumption and performance metrics after execution completes, allowing for comparison between estimates and actual results that can be valuable for improving the accuracy of future estimates and refining the approach selection process over time.

Overview of the Data Generation Platform

Figure 12:
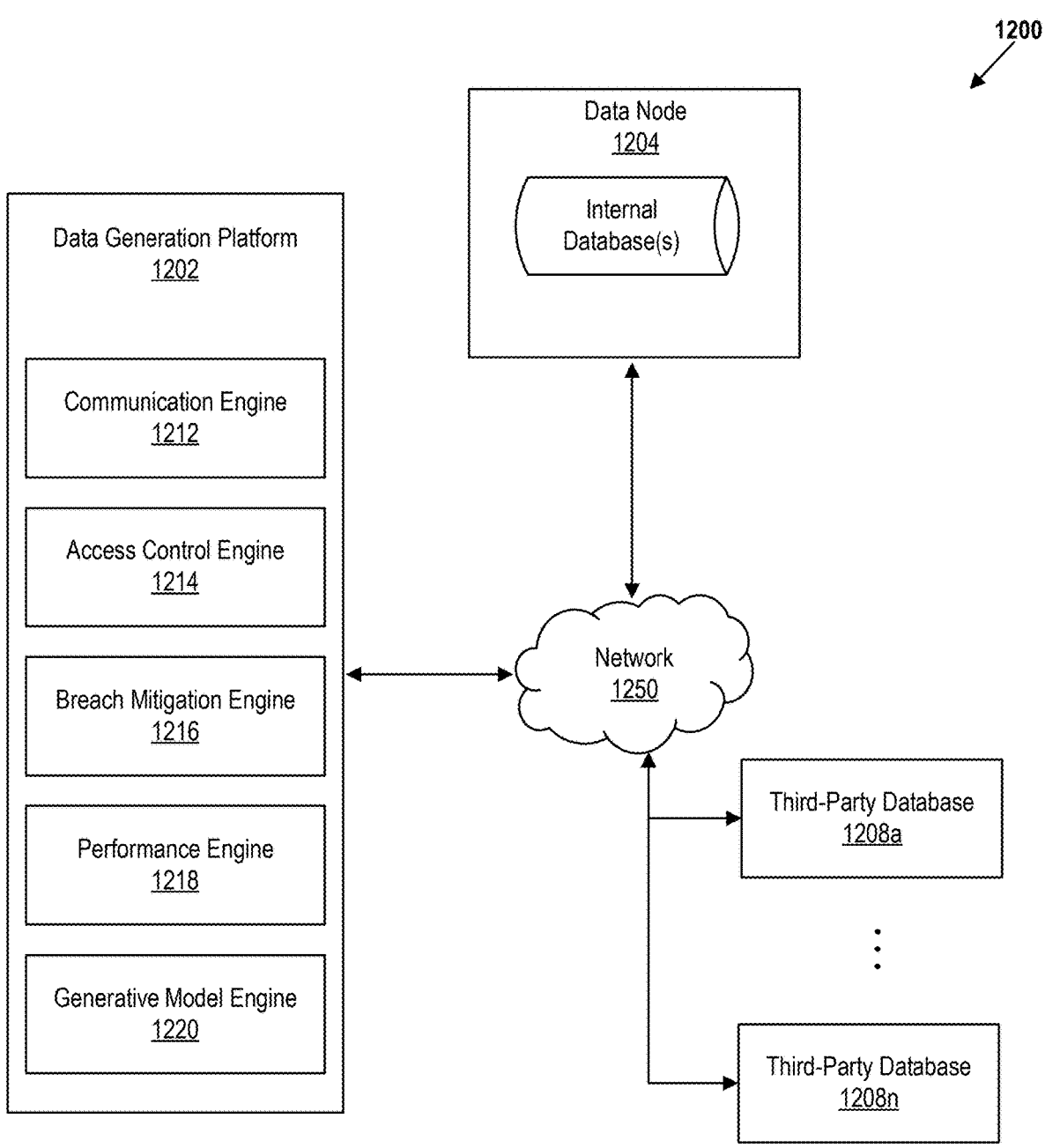
FIG. 12 shows an illustrative environment for evaluating language model prompts and outputs for model selection and validation, in accordance with some implementations of the disclosed technology.

FIG. 12 shows an illustrative environment 1200 for evaluating machine learning model inputs (e.g., language model prompts) and outputs for model selection and validation, in accordance with some implementations of the disclosed technology. For example, the environment 1200 includes the data generation platform 1202, which is capable of communicating with (e.g., transmitting or receiving data to or from) a data node 1204 and/or third-party databases 1208a-1208n via a network 1250. The data generation platform 1202 can include software, hardware, or a combination of both and can reside on a physical server or a virtual server running on a physical computer system. For example, the data generation platform 1202 can be distributed across various nodes, devices, or virtual machines (e.g., as in a distributed cloud server). In some implementations, the data generation platform 1202 can be configured on a user device (e.g., a laptop computer, smartphone, desktop computer, electronic tablet, or another suitable user device). Furthermore, the data generation platform 1202 can reside on a server or node and/or can interface with third-party databases 1208a-1208n directly or indirectly.

The data node 1204 can store various data, including one or more machine learning models, prompt validation models, associated training data, user data, performance metrics and corresponding values, validation criteria, and/or other suitable data. For example, the data node 1204 includes one or more databases, such as an event database (e.g., a database for storage of records, logs, or other information associated with large language model (LLM)-related user actions), a vector database, an authentication database (e.g., storing authentication tokens associated with users of the data generation platform 1202), a secret database, a sensitive token database, and/or a deployment database.

An event database can include data associated with events relating to the data generation platform 1202. For example, the event database stores records associated with users' inputs or prompts for generation of an associated natural language output (e.g., prompts intended for processing using an LLM). The event database can store timestamps and the associated user requests or prompts. In some implementations, the event database can receive records from the data generation platform 1202 that include model selections/determinations, prompt validation information, user authentication information, and/or other suitable information. For example, the event database stores platform-level metrics (e.g., bandwidth data, CPU usage metrics, and/or memory usage associated with devices or servers associated with the data generation platform 1202). By doing so, the data generation platform 1202 can store and track information relating to performance, errors, and troubleshooting. The data generation platform 1202 can include one or more subsystems or subcomponents. For example, the data generation platform 1202 includes a communication engine 1212, an access control engine 1214, a breach mitigation engine 1216, a performance engine 1218, and/or a generative model engine 1220.

A vector database can include data associated with vector embeddings of data. For example, the vector database includes numerical representations (e.g., arrays of values) that represent the semantic meaning of unstructured data (e.g., text data, audio data, or other similar data). For example, the data generation platform 1202 receives inputs such as unstructured data, including text data, such as a prompt, and utilize a vector encoding model (e.g., with a transformer or neural network architecture) to generate vectors within a vector space that represents meaning of data objects (e.g., of words within a document). By storing information within a vector database, the data generation platform 1202 can represent inputs, outputs, and other data in a processable format (e.g., with an associated LLM), thereby improving the efficiency and accuracy of data processing.

An authentication database can include data associated with user or device authentication. For example, the authentication database includes stored tokens associated with registered users or devices of the data generation platform 1202 or associated development pipeline. For example, the authentication database stores keys (e.g., public keys that match private keys linked to users and/or devices). The authentication database can include other user or device information (e.g., user identifiers, such as usernames, or device identifiers, such as medium access control (MAC) addresses). In some implementations, the authentication database can include user information and/or restrictions associated with these users.

A sensitive token (e.g., secret) database can include data associated with secret or otherwise sensitive information. For example, secrets can include sensitive information, such as API keys, passwords, credentials, or other such information. For example, sensitive information includes personally identifiable information (PII), such as names, identification numbers, or biometric information. By storing secrets or other sensitive information, the data generation platform 1202 can evaluate prompts and/or outputs to prevent breaches or leakage of such sensitive information.

A deployment database can include data associated with deploying, using, or viewing results associated with the data generation platform 1202. For example, the deployment database can include a server system (e.g., physical or virtual) that stores validated outputs or results from one or more LLMs, where such results can be accessed by the requesting user.

The data generation platform 1202 can receive inputs (e.g., prompts), training data, validation criteria, and/or other suitable data from one or more devices, servers, or systems.

The data generation platform 1202 can receive such data using the communication engine 1212, which can include software components, hardware components, or a combination of both. For example, the communication engine 1212 includes or interfaces with a network card (e.g., a wireless network card and/or a wired network card) that is associated with software to drive the card and enables communication with the network 1250. In some implementations, the communication engine 1212 can also receive data from and/or communicate with the data node 1204, or another computing device. The communication engine 1212 can communicate with the access control engine 1214, the breach mitigation engine 1216, the performance engine 1218, and the generative model engine 1220.

In some implementations, the data generation platform 1202 can include the access control engine 1214. The access control engine 1214 can perform tasks relating to user/device authentication, controls, and/or permissions. For example, the access control engine 1214 receives credential information, such as authentication tokens associated with a requesting device and/or user. In some implementations, the access control engine 1214 can retrieve associated stored credentials (e.g., stored authentication tokens) from an authentication database (e.g., stored within the data node 1204). The access control engine 1214 can include software components, hardware components, or a combination of both. For example, the access control engine 1214 includes one or more hardware components (e.g., processors) that are able to execute operations for authenticating users, devices, or other entities (e.g., services) that request access to an LLM associated with the data generation platform 1202. The access control engine 1214 can directly or indirectly access data, systems, or nodes associated with the third-party databases 1208a-1208n and can transmit data to such nodes. Additionally or alternatively, the access control engine 1214 can receive data from and/or send data to the communication engine 1212, the breach mitigation engine 1216, the performance engine 1218, and/or the generative model engine 1220.

The breach mitigation engine 1216 can execute tasks relating to the validation of inputs and outputs associated with the LLMs. For example, the breach mitigation engine 1216 validates inputs (e.g., prompts) to prevent sensitive information leakage or malicious manipulation of LLMs, as well as to validate the security or safety of the resulting outputs. The breach mitigation engine 1216 can include software components (e.g., modules/virtual machines that include prompt validation models, performance criteria, and/or other suitable data or processes), hardware components, or a combination of both. As an illustrative example, the breach mitigation engine 1216 monitors prompts for the inclusion of sensitive information (e.g., PII), or other forbidden text, to prevent leakage of information from the data generation platform 1202 to entities associated with the target LLMs. The breach mitigation engine 1216 can communicate with the communication engine 1212, the access control engine 1214, the performance engine 1218, the generative model engine 1220, and/or other components associated with the network 1250 (e.g., the data node 1204 and/or the third-party databases 1208a-1208n).

The performance engine 1218 can execute tasks relating to monitoring and controlling performance of the data generation platform 1202 (e.g., or the associated development pipeline). For example, the performance engine 1218 includes software components (e.g., performance monitoring modules), hardware components, or a combination thereof. To illustrate, the performance engine 1218 can estimate performance metric values associated with processing a given prompt with a selected LLM (e.g., an estimated cost or memory usage). By doing so, the performance engine 1218 can determine whether to allow access to a given LLM by a user, based on the user's requested output and the associated estimated system effects. The performance engine 1218 can communicate with the communication engine 1212, the access control engine 1214, the breach mitigation engine 1216, the generative model engine 1220, and/or other components associated with the network 1250 (e.g., the data node 1204 and/or the third-party databases 1208a-1208n).

The generative model engine 1220 can execute tasks relating to machine learning inference (e.g., natural language generation based on a generative machine learning model, such as an LLM). The generative model engine 1220 can include software components (e.g., one or more LLMs, and/or API calls to devices associated with such LLMs), hardware components, and/or a combination thereof. To illustrate, the generative model engine 1220 can provide users' prompts to a requested, selected, or determined model (e.g., LLM) to generate a resulting output (e.g., to a user's query within the prompt). As such, the generative model engine 1220 enables flexible, configurable generation of data (e.g., text, code, or other suitable information) based on user input, thereby improving the flexibility of software development or other such tasks. The generative model engine 1220 can communicate with the communication engine 1212, the access control engine 1214, the breach mitigation engine 1216, the performance engine 1218, and/or other components associated with the network 1250 (e.g., the data node 1204 and/or the third-party databases 1208a-1208n).

Engines, subsystems, or other components of the data generation platform 1202 are illustrative. As such, operations, subcomponents, or other aspects of particular subsystems of the data generation platform 1202 can be distributed, varied, or modified across other engines. In some implementations, particular engines can be deprecated, added, or removed. For example, operations associated with breach mitigation are performed at the performance engine 1218 instead of at the breach mitigation engine 1216.

Suitable Computing Environments of the Data Generation Platform

Figure 13:
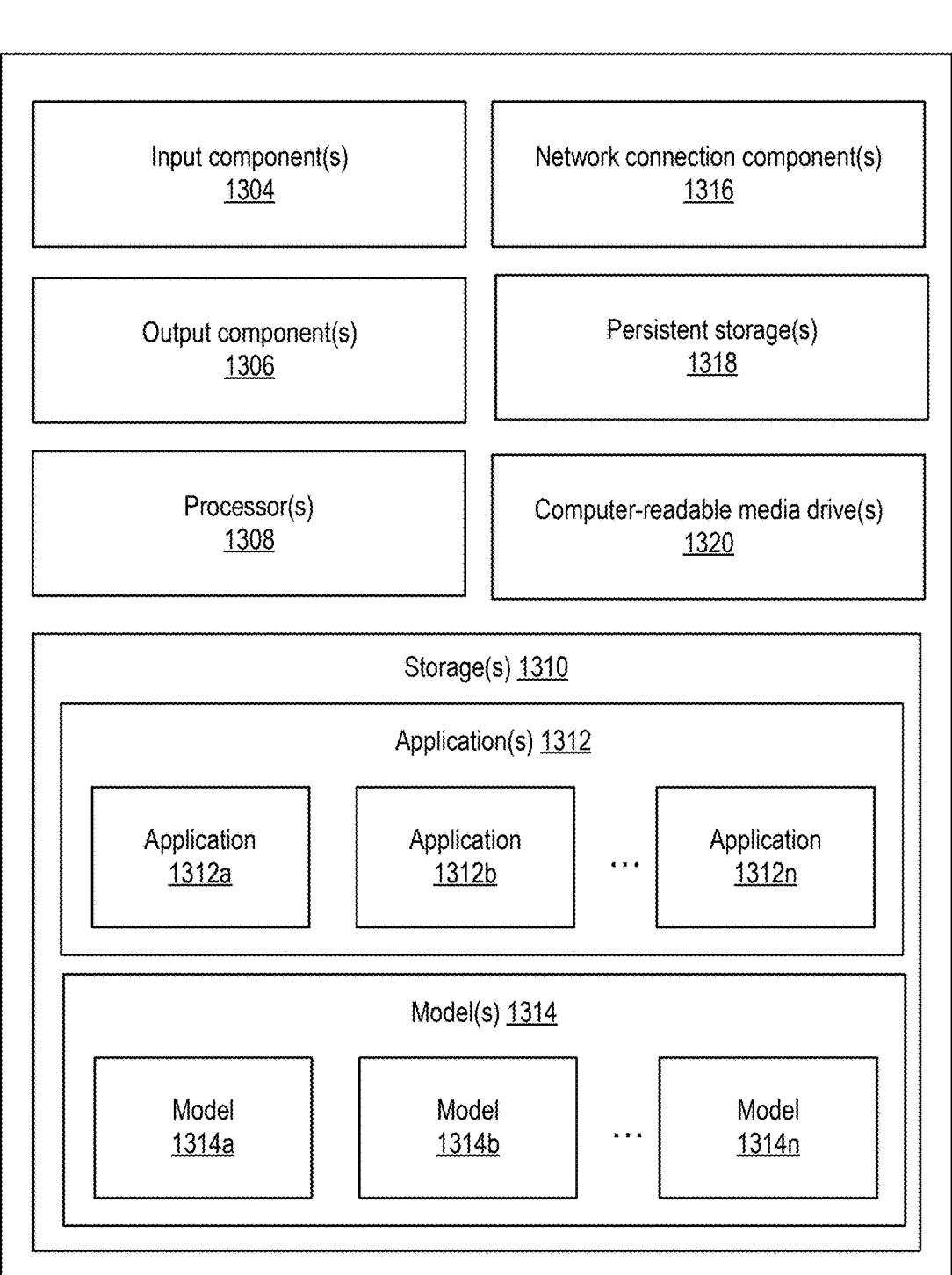
FIG. 13 shows a block diagram illustrating some of the components typically incorporated in at least some of the computer systems and other devices on which the disclosed system operates, in accordance with some implementations of the disclosed technology.

FIG. 13 shows a block diagram illustrating some of the components typically incorporated in at least some of the computer systems and other devices 1300 on which the disclosed system (e.g., the data generation platform 1202) operates, in accordance with some implementations of the disclosed technology. In various implementations, these computer systems and other device(s) 1300 can include server computer systems, desktop computer systems, laptop computer systems, netbooks, mobile phones, personal digital assistants, televisions, cameras, automobile computers, electronic media players, web services, mobile devices, watches, wearables, glasses, smartphones, tablets, smart displays, virtual reality devices, augmented reality devices, etc. In various implementations, the computer systems and devices include zero or more of each of the following: input components 1304, including keyboards, microphones, image sensors, touch screens, buttons, track pads, mice, compact disc (CD) drives, digital video disc (DVD) drives, 3.5 mm input jack, High-Definition Multimedia Interface (HDMI) input connections, Video Graphics Array (VGA) input connections, Universal Serial Bus (USB) input connections, or other computing input components; output components 1306, including display screens (e.g., liquid crystal displays (LCDs), organic light-emitting diodes (OLEDs), cathode ray tubes (CRTs), etc.), speakers, 3.5 mm output jack, lights, light emitting diodes (LEDs), haptic motors, or other output-related components; processor(s) 1308, including a CPU for executing computer programs or a GPU for executing computer graphic programs and handling computing graphical elements; storage(s) 1310, including at least one computer memory for storing programs (e.g., application(s) 1312a-n, model(s) 1314a-n, and other programs) and data while they are being used, including the facility and associated data, an operating system including a kernel, and device drivers; network connection component(s) 1316 for the computer system to communicate with other computer systems and to send and/or receive data, such as via the Internet or another network and its networking hardware, such as switches, routers, repeaters, electrical cables and optical fibers, light emitters and receivers, radio transmitters and receivers, and the like; a persistent storage (s) device 1318, such as a hard drive or flash drive for persistently storing programs and data; and computer-readable media drives 1320 (e.g., at least one non-transitory computer-readable medium) that are tangible storage means that do not include a transitory, propagating signal, such as a floppy, CD-ROM, or DVD drive, for reading programs and data stored on a computer-readable medium. While computer systems configured as described above are typically used to support the operation of the facility, those skilled in the art will appreciate that the facility can be implemented using devices of various types and configurations and having various components.

Figure 14:
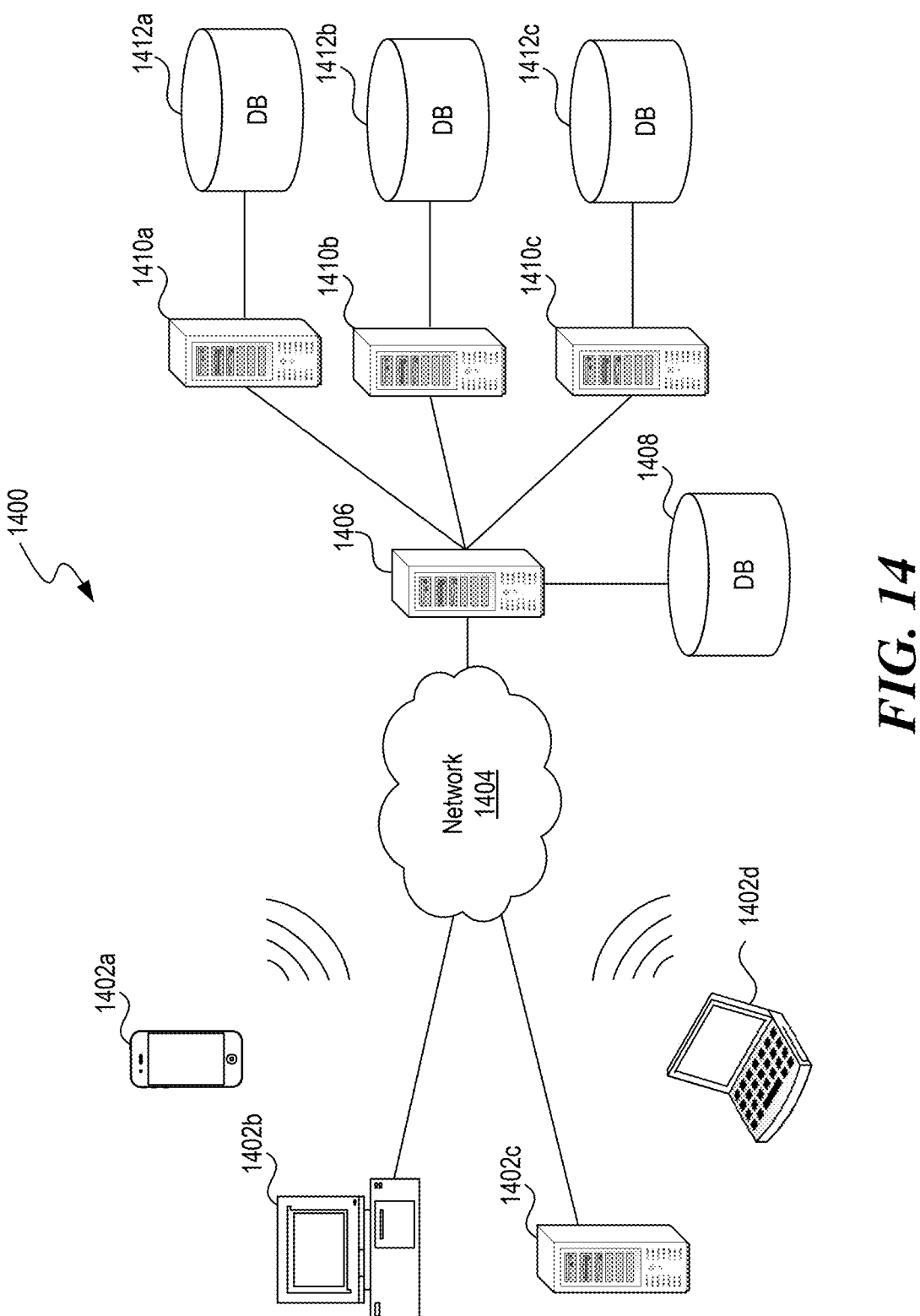
FIG. 14 shows a system diagram illustrating an example of a computing environment in which the disclosed system operates, in accordance with some implementations of the disclosed technology.

FIG. 14 shows a system diagram illustrating an example of a computing environment 1400 in which the disclosed system operates, in accordance with some implementations of the disclosed technology. In some implementations, environment 1400 includes one or more client computing devices 1402a-1402d, examples of which can host graphical user interfaces associated with client devices. For example, one or more of the client computing devices 1402a-1402d includes user devices and/or devices associated with services requesting responses to queries from LLMs. Client computing devices 1402 operate in a networked environment using logical connections through network 1404 (e.g., the network 1250 of FIG. 12) to one or more remote computers, such as a server computing device (e.g., a server system housing the data generation platform 1202 of FIG. 12). In some implementations, client computing devices 1402 can correspond to device 1300 (FIG. 13).

In some implementations, server computing device 1406 is an edge server that receives client requests and coordinates fulfillment of those requests through other servers, such as server computing devices 1410a-1410c. In some implementations, server computing devices 1406 and 1410 include computing systems. Though each server computing device 1406 and 1410 is displayed logically as a single server, server computing devices can each be a distributed computing environment encompassing multiple computing devices located at the same or at geographically disparate physical locations. In some implementations, each server computing device 1410 corresponds to a group of servers.

Client computing devices 1402 and server computing devices 1406 and 1410 can each act as a server or client to other server or client devices. In some implementations, server computing devices (1406, 1410a-1410c) connect to a corresponding database (1408, 1412a-1412c). For example, the corresponding database includes a database stored within the data node 1204 (e.g., a sensitive token database, an event database, or another suitable database). As discussed above, each server computing device 1410 can correspond to a group of servers, and each of these servers can share a database or can have its own database (and/or interface with external databases, such as third-party databases 1208a-1208n). In addition to information described concerning the data node 1204 of FIG. 12, databases 1408 and 1412 can warehouse (e.g., store) other suitable information, such as sensitive or forbidden tokens, user credential data, authentication data, graphical representations, code samples, system policies or other policies, templates, computing languages, data structures, software application identifiers, visual layouts, computing language identifiers, mathematical formulae (e.g., weighted average, weighted sum, or other mathematical formulas), graphical elements (e.g., colors, shapes, text, images, multimedia), system protection mechanisms (e.g., prompt validation model parameters or criteria), software development or data processing architectures, machine learning models, AI models, training data for AI/machine learning models, historical information, or other information.

Though databases 1408 and 1412 are displayed logically as single units, databases 1408 and 1412 can each be a distributed computing environment encompassing multiple computing devices, can be located within their corresponding server, or can be located at the same or at geographically disparate physical locations.

Network 1404 (e.g., corresponding to the network 1250) can be a local area network (LAN) or a wide area network (WAN) but can also be other wired or wireless networks. In some implementations, network 1404 is the Internet or some other public or private network. Client computing devices 1402 are connected to network 1404 through a network interface, such as by wired or wireless communication. While the connections between server computing device 1406 and server computing device 1410 are shown as separate connections, these connections can be any kind of LAN, WAN, wired network, or wireless network, including network 1404 or a separate public or private network.

Figure 15:
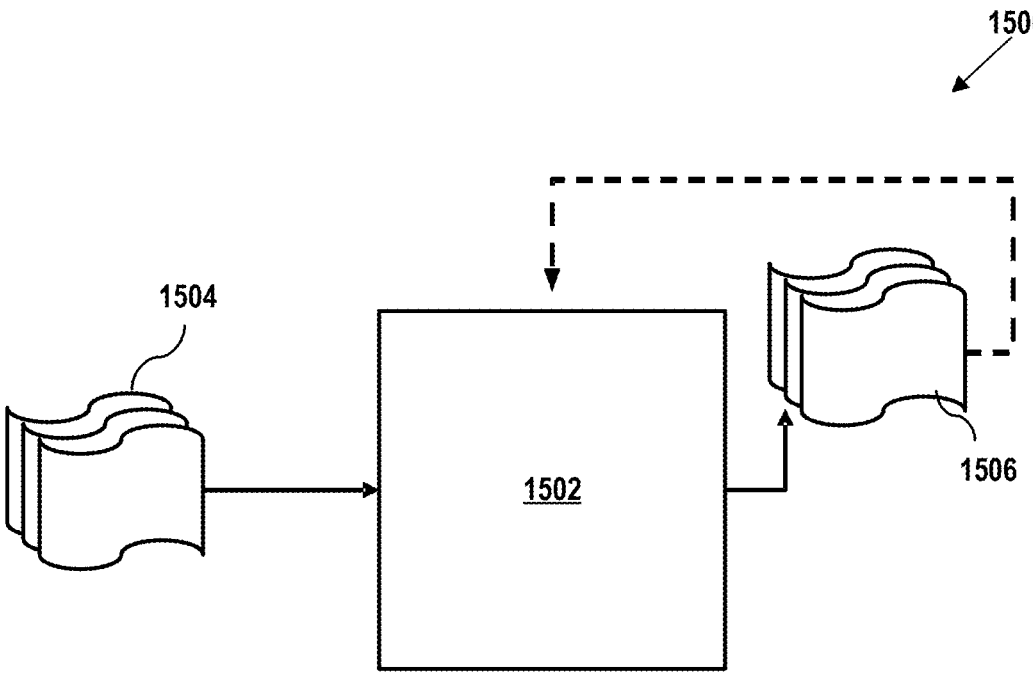
FIG. 15 shows a diagram of an AI model, in accordance with some implementations of the disclosed technology.

FIG. 15 shows a diagram of an AI model, in accordance with some implementations of the disclosed technology. AI model 1500 is shown. In some implementations, AI model 1500 can be any AI model. In some implementations, AI model 1500 can be part of, or work in conjunction with, server computing device 1406 (FIG. 14). For example, server computing device 1406 can store a computer program that can use information obtained from AI model 1500, provide information to AI model 1500, or communicate with AI model 1500. In other implementations, AI model 1500 can be stored in database 1408 and can be retrieved by server computing device 1406 to execute/process information related to AI model 1500.

In some implementations, AI model 1500 can be a machine learning model 1502. Machine learning model 1502 can include one or more neural networks or other machine learning models. As an example, neural networks can be based on a large collection of neural units (or artificial neurons). Neural networks can loosely mimic the manner in which a biological brain works (e.g., via large clusters of biological neurons connected by axons). Each neural unit of a neural network can be connected with many other neural units of the neural network. Such connections can be enforcing or inhibitory in their effect on the activation state of connected neural units. In some implementations, each individual neural unit can have a summation function that combines the values of all its inputs together. In some implementations, each connection (or the neural unit itself) can have a threshold function such that the signal must surpass the threshold before it propagates to other neural units. These neural network systems can be self-learning and trained, rather than explicitly programmed, and can perform significantly better in certain areas of problem solving, as compared to traditional computer programs. In some implementations, neural networks can include multiple layers (e.g., where a signal path traverses from front layers to back layers). In some implementations, backpropagation techniques can be utilized by the neural networks, where forward stimulation is used to reset weights on the "front" neural units. In some implementations, stimulation and inhibition for neural networks can be more free-flowing, with connections interacting in a more chaotic and complex fashion.

As an example, with respect to FIG. 15, machine learning model 1502 can take inputs 1504 and provide outputs 1506. In one use case, outputs 1506 can be fed back to machine learning model 1502 as input to train machine learning model 1502 (e.g., alone or in conjunction with user indications of the accuracy of outputs 1506, labels associated with the inputs, or other reference feedback information). In another use case, machine learning model 1502 can update its configurations (e.g., weights, biases, or other parameters) based on its assessment of its prediction (e.g., outputs 1506) and reference feedback information (e.g., user indication of accuracy, reference labels, or other information). In another use case, where machine learning model 1502 is a neural network, connection weights can be adjusted to reconcile differences between the neural network's prediction and the reference feedback. In a further use case, one or more neurons (or nodes) of the neural network can require that their respective errors are sent backward through the neural network to them to facilitate the update process (e.g., backpropagation of error). Updates to the connection weights can, for example, be reflective of the magnitude of error propagated backward after a forward pass has been completed. In this way, for example, the machine learning model 1502 can be trained to generate better predictions.

As an example, where the prediction models include a neural network, the neural network can include one or more input layers, hidden layers, and output layers. The input and output layers can respectively include one or more nodes, and the hidden layers can each include a plurality of nodes. When an overall neural network includes multiple portions trained for different objectives, there can or can not be input layers or output layers between the different portions. The neural network can also include different input layers to receive various input data. Also, in differing examples, data can be input to the input layer in various forms, and in various dimensional forms input to respective nodes of the input layer of the neural network. In the neural network, nodes of layers other than the output layer are connected to nodes of a subsequent layer through links for transmitting output signals or information from the current layer to the subsequent layer, for example. The number of the links can correspond to the number of the nodes included in the subsequent layer. For example, in adjacent fully connected layers, each node of a current layer can have a respective link to each node of the subsequent layer, noting that in some examples such full connections can later be pruned or minimized during training or optimization. In a recurrent structure, a node of a layer can be again input to the same node or layer at a subsequent time, while in a bi-directional structure, forward and backward connections can be provided. The links are also referred to as connections or connection weights, referring to the hardware-implemented connections or the corresponding "connection weights" provided by those connections of the neural network. During training and implementation, such connections and connection weights can be selectively implemented, removed, and varied to generate or obtain a resultant neural network that is thereby trained and that can be correspondingly implemented for the trained objective, such as for any of the above example recognition objectives.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number can also include the plural or singular number, respectively. The word "or," in reference to a list of two or more items, covers all of the following interpretations of the word: any of the items in the list, all of the items in the list, and any combination of the items in the list.

The above Detailed Description of examples of the technology is not intended to be exhaustive or to limit the technology to the precise form disclosed above. While specific examples of the technology are described above for illustrative purposes, various equivalent modifications are possible within the scope of the technology, as those skilled in the relevant art will recognize. For example, while processes or blocks are presented in a given order, alternative implementations can perform routines having steps, or employ systems having blocks, in a different order, and some processes or blocks can be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples: alternative implementations can employ differing values or ranges.

The teachings of the technology provided herein can be applied to other systems, not necessarily the system described above. The elements and acts of the various examples described above can be combined to provide further implementations of the technology. Some alternative implementations of the technology not only can include additional elements to those implementations noted above, but also can include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system can vary considerably in its specific implementation, while still being encompassed by the technology disclosed herein. As noted above, specific terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects can likewise be embodied as a computer-readable medium claim, or in other forms, such as being embodied in a means-plus-function claim. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application to pursue such additional claim forms, either in this application or in a continuing application.

We claim:

1. One or more non-transitory, computer-readable storage media comprising instructions recorded thereon for estimating resource usage between agentic approaches, wherein the instructions, when executed by at least one data processor of a system, cause the system to:
    receive a prompt from a user, the prompt indicating one or more computational objectives;
    determine, based on the prompt, a plurality of artificial intelligence (AI) agentic approaches for processing the prompt, wherein each AI agentic approach comprises a sequence of multiple AI models configured to perform respective sub-tasks required to achieve the one or more computational objectives;
    determine a subset of the plurality of AI agentic approaches, wherein the subset comprises AI agentic approaches that comply with one or more operational policies indicating resource allocation constraints;
    generate, for each AI agentic approach of the subset, a resource utilization estimate and a performance estimate, wherein the resource utilization estimate represents an anticipated resource consumption of each AI agentic approach and the performance estimate represents a value of an expected output from each AI agentic approach, wherein the resource utilization estimate and the performance estimate are calculated based on an evaluation of the sequence of multiple AI models and the respective sub-tasks involved in each AI agentic approach;
    execute, based on the resource utilization estimate and the performance estimate for each AI agentic approach, a particular AI agentic approach of the subset, wherein the particular AI agentic approach optimizes the resource utilization estimate and the performance estimate; and
    record, via a distributed ledger, the particular AI agentic approach, the resource utilization estimate, and the performance estimate.

2. The one or more non-transitory, computer-readable storage media of claim 1, wherein the instructions further cause the system to:

receive, from a plurality of models included in the particular AI agentic approach, requests for expedited access to resources using priority tokens; and
    manage queue positions for the plurality of models via automated scheduling algorithms.

3. The one or more non-transitory, computer-readable storage media of claim 1, wherein the instructions further cause the system to enable one or more models included in the particular AI agentic approach and having idle computational resources to share the idle computational resources with other models included in the particular AI agentic approach in exchange for resource tokens.

4. The one or more non-transitory, computer-readable storage media of claim 1, wherein the resource allocation constraints comprise progressive allocation tiers, anti-hoarding measures, minimum resource usage guarantees, and stability controls.

5. The one or more non-transitory, computer-readable storage media of claim 1, wherein the instructions further cause the system to implement a resource allocation platform configured to enable models included in the particular AI agentic approach to enter into standardized contracts for computational resources required to perform the respective sub-tasks, each contract specifying a resource type, an expiration period, and a settlement method.

6. The one or more non-transitory, computer-readable storage media of claim 1, wherein the instructions further cause the system to operate a reputation system configured to track reputation scores of models included in the particular AI agentic approach based on reliability, performance data, and disputes involving the models included in the particular AI agentic approach, and wherein access to shared resources by the models included in the particular AI agentic approach is determined at least in part by the reputation scores.

7. A method comprising:
    receiving a request from a user;
    determining, based on the request, a plurality of agentic approaches for processing the request, wherein each agentic approach comprises a sequence of multiple models configured to process the request;
    determining a subset of the plurality of agentic approaches, wherein the subset comprises agentic approaches that comply with one or more operational policies indicating resource allocation constraints;
    generating, for each agentic approach of the subset, a resource utilization estimate and a performance estimate, wherein the resource utilization estimate represents an anticipated resource consumption of each agentic approach and the performance estimate represents a value of an expected output from each agentic approach; and
    executing, based on the resource utilization estimate and the performance estimate for each agentic approach, a particular agentic approach of the subset, wherein the particular agentic approach optimizes the resource utilization estimate and the performance estimate.

8. The method of claim 7, further comprising:
    receiving, from a plurality of models included in the particular agentic approach, requests for expedited access to resources using priority tokens; and
    managing queue positions for the plurality of models via automated scheduling algorithms.

9. The method of claim 7, further comprising enabling one or more models included in the particular agentic approach and having idle computational resources to share the idle computational resources with other models included in the particular agentic approach in exchange for resource tokens.

10. The method of claim 7, wherein the resource allocation constraints comprise progressive allocation tiers, anti-hoarding measures, minimum resource usage guarantees, and stability controls.

11. The method of claim 7, further comprising implementing a resource allocation platform configured to enable models included in the particular agentic approach to enter into standardized contracts for computational resources required to perform respective sub-tasks required to process the request, each contract specifying a resource type, an expiration period, and a settlement method.

12. The method of claim 7, further comprising operating a reputation system configured to track reputation scores of models included in the particular agentic approach based on reliability, performance data, and disputes involving the models included in the particular agentic approach, and wherein access to shared resources by the models included in the particular agentic approach is determined at least in part by the reputation scores.

13. The method of claim 7, further comprising recording, via a distributed ledger, the particular agentic approach, the resource utilization estimate, and the performance estimate.

14. A system comprising:

a storage device; and one or more processors communicatively coupled to the storage device storing instructions thereon, that cause the one or more processors to:

receive a request from a user;

determine, based on the request, a plurality of agentic approaches for processing the request, wherein each agentic approach comprises a sequence of multiple models configured to process the request;

determine a subset of the plurality of agentic approaches, wherein the subset comprises agentic approaches that comply with one or more operational policies indicating resource allocation constraints;

generate, for each agentic approach of the subset, a resource utilization estimate and a performance estimate, wherein the resource utilization estimate represents an anticipated resource consumption of each agentic approach and the performance estimate represents a value of an expected output from each agentic approach; and execute, based on the resource utilization estimate and the performance estimate for each agentic approach, a particular agentic approach of the subset, wherein the particular agentic approach optimizes the resource utilization estimate and the performance estimate.

15. The system of claim 14, wherein the instructions further cause the one or more processors to:

receive, from a plurality of models included in the particular agentic approach, requests for expedited access to resources using priority tokens; and manage queue positions for the plurality of models via automated scheduling algorithms.

16. The system of claim 14, wherein the instructions further cause the one or more processors to enable one or more models included in the particular agentic approach and having idle computational resources to share the idle computational resources with other models included in the particular agentic approach in exchange for resource tokens.

17. The system of claim 14, wherein the resource allocation constraints comprise progressive allocation tiers, anti-hoarding measures, minimum resource usage guarantees, and stability controls.

18. The system of claim 14, wherein the instructions further cause the one or more processors to implement a resource allocation platform configured to enable models included in the particular agentic approach to enter into standardized contracts for computational resources required to perform respective sub-tasks required to process the request, each contract specifying a resource type, an expiration period, and a settlement method.

19. The system of claim 14, wherein the instructions further cause the one or more processors to operate a reputation system configured to track reputation scores of models included in the particular agentic approach based on reliability, performance data, and disputes involving the models included in the particular agentic approach, and wherein access to shared resources by the models included in the particular agentic approach is determined at least in part by the reputation scores.

20. The system of claim 14, further comprising recording, via a distributed ledger, the particular agentic approach, the resource utilization estimate, and the performance estimate.

* * * * *